United States Patent
Yeh et al.

(10) Patent No.: US 11,766,812 B2
(45) Date of Patent: Sep. 26, 2023

(54) INJECTION MOLDING SYSTEM AND INJECTION MOLDING METHOD

(71) Applicant: KING STEEL MACHINERY CO., LTD., Taichung (TW)

(72) Inventors: Liang-Hui Yeh, Taichung (TW); Ching-Hao Chen, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 0 days.

(21) Appl. No.: 17/582,798

(22) Filed: Jan. 24, 2022

(65) Prior Publication Data
US 2022/0143880 A1 May 12, 2022

Related U.S. Application Data

(63) Continuation-in-part of application No. 16/857,092, filed on Apr. 23, 2020, now Pat. No. 11,267,175.
(Continued)

(51) Int. Cl.
*B29C 44/34* (2006.01)
*B29C 44/42* (2006.01)

(52) U.S. Cl.
CPC ........ *B29C 44/3442* (2013.01); *B29C 44/424* (2013.01)

(58) Field of Classification Search
CPC ..... B29C 45/30; B29C 45/2737; B29C 45/77; B29C 45/13; B29C 31/042
See application file for complete search history.

(56) References Cited

U.S. PATENT DOCUMENTS 2,955,972 A 10/1960 Wintermute et al.
3,827,841 A * 8/1974 Kawai .................. B29C 48/834
366/322
(Continued)

FOREIGN PATENT DOCUMENTS

CN 108189308 A 6/2018
CN 110234486 A 9/2019
(Continued)

OTHER PUBLICATIONS

Extended Search Report dated Mar. 1, 2021 issued by the European Patent Office for the European patent application No. 20201848.7-1017.
(Continued)

*Primary Examiner* — Kelly M Gambetta
*Assistant Examiner* — Virak Nguon
(74) *Attorney, Agent, or Firm* — WPAT LAW; Anthony King

(57) ABSTRACT

An injection molding system includes an extruding system. The extruding system includes a mixing unit configured to receive the polymeric material from the melting unit and configured to mix a polymeric material with a blowing agent and to form a mixture, wherein the mixing unit includes a mixing rotor disposed in a hollow mixing cartridge, and a ratio of a shortest distance between an inner sidewall of the hollow mixing cartridge and the mixing rotor to a diameter of the mixing rotor is in a range of 1:1500 to 1:4500. The injection molding system further includes a discharging channel communicable with the extruding system, a molding device configured to receive the mixture from the discharging channel, and a supporting device configured to facilitate an engagement of the discharging channel and the molding device, the supporting device includes a first ele-
(Continued)

ment protrudes from the extruding system and a second element disposed on the molding device.

20 Claims, 23 Drawing Sheets

Related U.S. Application Data

(60) Provisional application No. 63/236,044, filed on Aug. 23, 2021, provisional application No. 62/950,454, filed on Dec. 19, 2019, provisional application No. 62/915,287, filed on Oct. 15, 2019.

(56) References Cited

U.S. PATENT DOCUMENTS

| | | | |
|---|---|---|---|
| 3,891,362 A | 6/1975 | Devita | |
| 4,042,663 A | 8/1977 | Harder, Jr. | |
| 4,250,132 A * | 2/1981 | Beach | B29C 48/395 264/211 |
| 4,699,581 A * | 10/1987 | Nagasaka | B29C 45/5008 425/574 |
| 5,976,289 A | 11/1999 | Kawakubo et al. | |
| 5,989,480 A | 11/1999 | Yamazaki | |
| 2004/0108612 A1 | 6/2004 | Yamaki et al. | |
| 2006/0062967 A1 | 3/2006 | Summerer | |
| 2012/0196115 A1* | 8/2012 | Choe | B29D 35/142 428/304.4 |
| 2012/0267815 A1* | 10/2012 | Tokunou | B29C 45/34 425/546 |
| 2014/0084663 A1 | 3/2014 | Todd et al. | |
| 2018/0345546 A1* | 12/2018 | Chen | B29B 7/94 |
| 2020/0391416 A1 | 12/2020 | Burnham et al. | |

FOREIGN PATENT DOCUMENTS

| | | |
|---|---|---|
| CN | 21566143 U | 1/2022 |
| EP | 0692358 A | 1/1996 |
| EP | 0799853 A1 | 10/1997 |
| EP | 1826214 A | 8/2006 |
| EP | 3789176 A | 3/2021 |
| EP | 3808527 A | 4/2021 |
| EP | 3815870 A | 5/2021 |
| GB | 2179886 A | 3/1987 |
| JP | H01145422 U | 10/1989 |
| JP | H0872098 A | 3/1996 |
| JP | 2000015657 A | 1/2000 |
| JP | 2000084968 A | 3/2000 |
| JP | 2001150504 A | 6/2001 |
| JP | 2004066500 A | 3/2004 |
| JP | 3805423 B2 | 8/2006 |
| TW | 201736093 A | 10/2017 |
| TW | M634595 U | 11/2022 |
| WO | 93/22129 A | 11/1993 |

OTHER PUBLICATIONS

Notice of allowance and Cited References dated Mar. 16, 2022 issued by the Korean Intellectual Property Office for the Korean patent application No. 10-2020-124149.

Office Action, Cited References and Search Report dated May 12, 2022 issued by the China National Intellectual Property Administration for the Chinese counterpart patent application No. 202011099752.X.

Search Report from the European Patent Office of EP patent application No. 22172580.7-1014 dated Oct. 14, 2022.

Office Action and Search Report dated Oct. 25, 2022 issued by Taiwan Intellectual Property Office for application No. 111128677.

Search Report from the European Patent Office of EP patent application No. 22 187 756.6-1014 dated Dec. 12, 2022.

Search Report from the European Patent Office of EP patent application No. 22 191 550.7-1014 dated Dec. 14, 2022.

Office action, Cited References and Search report dated Jan. 4, 2023 issued by the Taiwan Intellectual Property Office (TIPO) for the Taiwanese application No. 111131135.

Office action, Cited References and Search report dated Feb. 17, 2023 issued by the Taiwan Intellectual Property Office (TIPO) for the Taiwanese application No. 111131135.

* cited by examiner

INJECTION MOLDING SYSTEM AND INJECTION MOLDING METHOD

CROSS-REFERENCE TO RELATED APPLICATION

This application is a continuation-in-part application of a U.S. patent application entitled INJECTION MOLDING SYSTEM, Ser. No. 16/857,092, filed Apr. 23, 2020, which claims priority of U.S. provisional application Ser. No. 62/915,287 filed on Oct. 15, 2019 and U.S. provisional application Ser. No. 62/950,454 filed on Dec. 19, 2019, and this application claims priority of U.S. provisional application Ser. No. 63/236,044 filed on Aug. 23, 2021, both of which are incorporated by reference in their entirety.

TECHNICAL FIELD

The present invention is related to an injection molding system and an injection molding method, and, in particular, to an injection molding system and an injection molding method for making a foamed polymeric article.

BACKGROUND

Foamed polymeric material has many advantages, such as high strength, low weight, impact resistance, thermal insulation, and others. Foamed polymeric articles can be made by injection molding or extrusion molding. For example, after the polymeric material is melted and mixed with a blowing agent to form a mixture, a force or pressure is applied to the mixture to inject or extrude the mixture into a cavity of a mold, and the mixture is foamed in the cavity to form the foamed polymeric article. There is a need to provide foamed polymeric articles with stable properties, such as low density.

BRIEF SUMMARY OF THE INVENTION

One purpose of the present invention is to provide an injection molding system and a method of injection molding.

According to one embodiment of the present disclosure, an injection molding system is disclosed. The injection molding system includes an extruding system, a discharging channel, a molding device, and a supporting device.

The extruding system is configured to produce a mixture of a polymeric material and a blowing agent. The extruding system includes a melting unit configured to convey the polymeric material; and a mixing unit configured to receive the polymeric material from the melting unit and configured to mix the polymeric material with the blowing agent and to form the mixture. The mixing unit includes a hollow mixing cartridge and a mixing rotor disposed in the hollow mixing cartridge, a length of the mixing rotor extends along a length of the hollow mixing cartridge, and a ratio of a shortest distance between an inner sidewall of the hollow mixing cartridge and the mixing rotor to a diameter of the mixing rotor is in a range of about 1:1500 to about 1:4500. The discharging channel is communicable with the extruding system, wherein the discharging channel includes an outlet disposed distal to the extruding system and configured to discharge the mixture. The molding device is configured to receive the mixture from the outlet. The molding device includes a mold cavity and a feeding port communicable with the mold cavity and correspondingly engageable with the outlet.

The supporting device is configured to facilitate an engagement of the discharging channel and the molding device. The supporting device includes a first element and a second element configured to engage with each other, wherein the first element of the supporting device protrudes from the extruding system to the second element disposed on the molding device.

According to one embodiment of the present disclosure, a method of injection molding is disclosed. The method of injection molding includes providing an extruding system configured to produce a mixture of a polymeric material and a blowing agent and having a melting unit and a mixing unit, a discharging channel communicable with the extruding system and including an outlet disposed distal to the extruding system and configured to discharge the mixture, and a first molding device including a first mold cavity and a first feeding port communicable with the first mold cavity and correspondingly engageable with the outlet, wherein the mixing unit includes a hollow mixing cartridge and a mixing rotor disposed in the hollow mixing cartridge, a length of the mixing rotor extends along a length of the hollow mixing cartridge, and a ratio of a shortest distance between an inner sidewall of the hollow mixing cartridge and the mixing rotor to a diameter of the mixing rotor is in a range of about 1:1500 to about 1:4500.

The injection molding method further includes conveying the polymeric material from the melting unit to the mixing unit; conveying the blowing agent into the mixing unit; mixing the polymeric material with the blowing agent in the hollow mixing cartridge of the mixing unit to form the mixture; conveying the mixture from the mixing unit to the discharging channel; and engaging the outlet with the feeding port. The injection molding method further includes securing the discharging channel to the first molding device; discharging a first amount of the mixture from the discharging channel; and injecting the first amount of the mixture into the first mold cavity through the outlet and the first feeding port.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
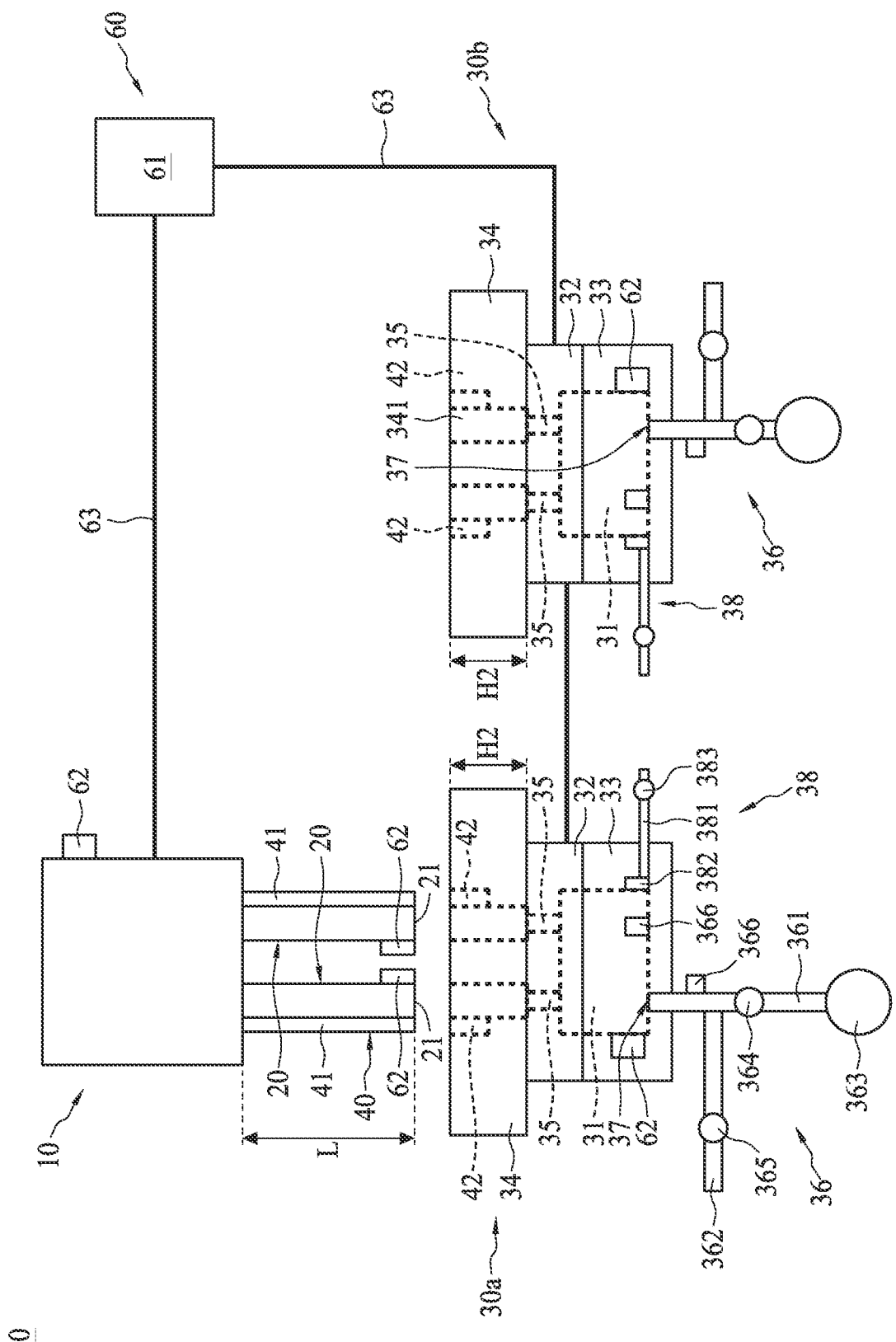
FIG. 1 is a schematic diagram of an injection molding system according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a schematic diagram view of an injection molding system 100 according to one embodiment of the present invention. The injection molding system 100 includes an extruding system 10, a discharging channel 20, a molding device 30a, and a supporting device 40. The extruding system 10 is configured to produce the mixture of a polymeric material and a blowing agent, and configured to inject the mixture into the discharging channel 20. The extruding system 10 is connected to or communicable with the discharging channel 20. The discharging channel 20 includes an outlet 21 disposed distal to the extruding system 10 and configured to discharge the mixture. The molding device 30a is configured to receive the mixture from the outlet 21 of the discharging channel 20. The supporting device 40 is configured to facilitate an engagement of the discharging channel 20 and the molding device 30a.

In some embodiments, the polymeric material includes a high molecular weight polymer. In some embodiments, the polymeric material includes ethylene vinyl acetate (EVA), styrene-ethylene-butylene-styrene (SEBS), thermoplastic polyurethanes (TPU), thermoplastic polyester elastomer (EPEE) or the like. In some embodiments, the polymeric material includes a foamable material. In some embodiments, the blowing agent is a physical or chemical additive that releases gas, thereby forming pores in the thus-obtained foamed polymeric article. In some embodiments, the blowing agent is a physical additive. The physical blowing agent includes an atmospheric gas (e.g., nitrogen or carbon dioxide), a hydrocarbon, a chlorofluorocarbon, a noble gas, or a combination thereof. The blowing agent may be supplied in any flowable physical state, for example, a gas, a liquid, or a supercritical fluid (SCE).

Figure 2:
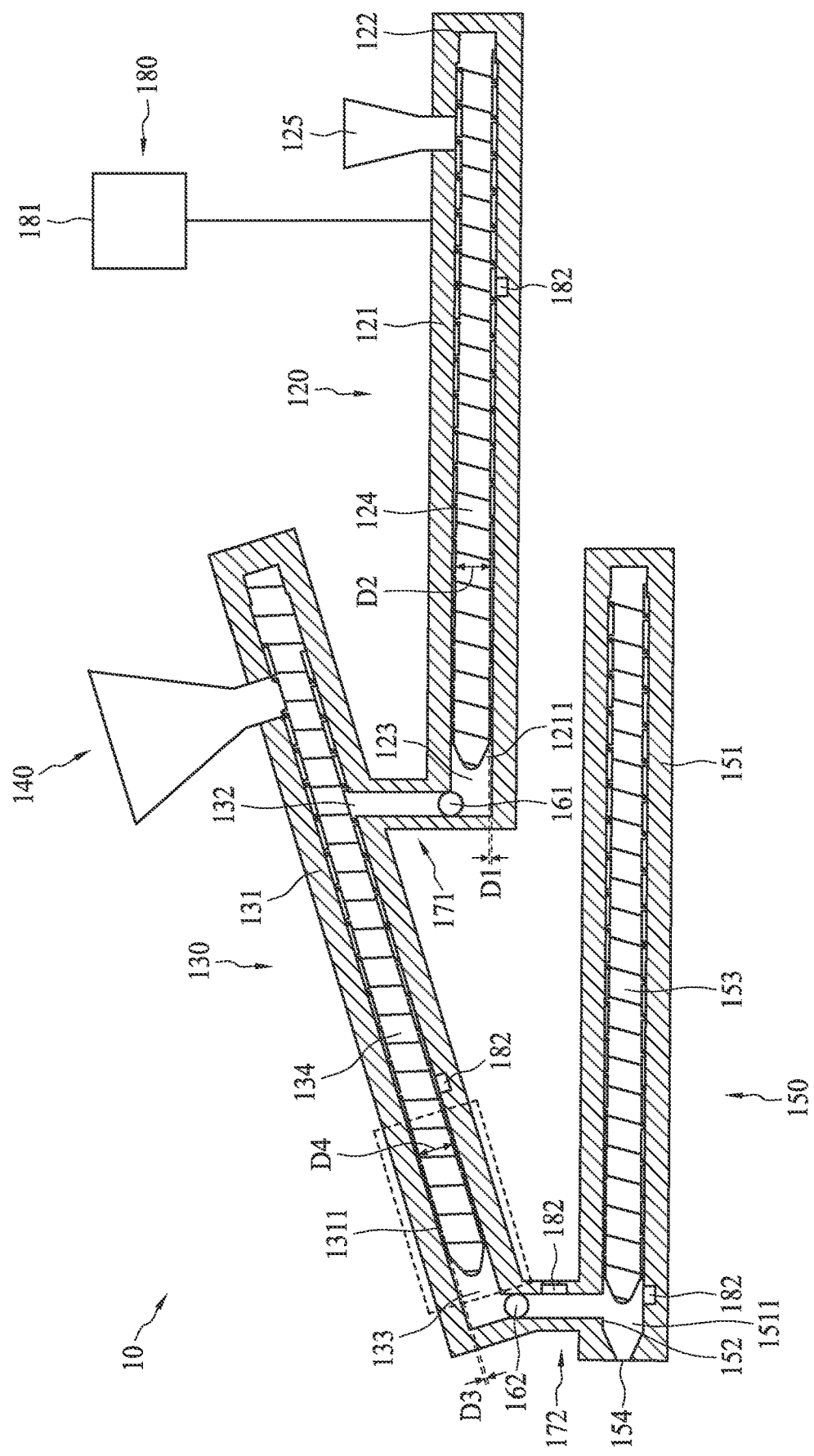
FIG. 2 is a schematic diagram of a portion of an injection molding system in FIG. 1 according to one embodiment of the present invention.

FIG. 2 is a schematic diagram view of the extruding system according to aspects of the present disclosure in some embodiments. The extruding system 10 includes a melting unit 120, a mixing unit 130, a blowing agent supply unit 140, an injection unit 150, a first flow control element 161, a second flow control element 162, and a monitoring module 180.

In some embodiments, referring to FIG. 2, the melting unit 120 is configured to convey the polymeric material. In some embodiments, the melting unit 120 includes a pressing cartridge 121, a first feeding passage 122, a first discharging passage 123, and a pushing member 124. In some embodiments, the melting unit 120 further includes a feeding hopper 125.

In some embodiments, the first feeding passage 122 and the first discharging passage 123 are respectively disposed at two ends of the pressing cartridge 121. In some embodiments, the first feeding passage 122 communicates with an inner space 1211 of the pressing cartridge 121, and the first discharging passage 123 communicates with an external space of the pressing cartridge 121, wherein the first feeding passage 122 is configured to deliver the polymeric material to the inner space 1211 of the pressing cartridge 121. In some embodiments, the feeding hopper 125 is configured to deliver a polymeric material to the inner space 1211 of the pressing cartridge 121 through the first feeding passage 122.

The pushing member 124 is configured to convey the polymeric material from the first feeding passage 122 to the first discharging passage 123. In some embodiments, the pushing member 124 is disposed in the inner space 1211 of the pressing cartridge 121. In some embodiments, the pushing member 124 is disposed in the inner space 1211 of the pressing cartridge 121 between the first feeding passage 122 and the first discharging passage 123, and is used to force the polymeric material toward the first discharging passage 123. In some embodiments, the pushing member 124 is rotatable relative to the pressing cartridge 121. In some embodiments, the polymeric material is conveyed from the first feeding passage 122 to the first discharging passage 123 by rotation of the pushing member 124. In some embodiments, the pushing member 124 is immovable in a direction parallel to the longitudinal axis of the pressing cartridge 121.

In some embodiments, a length of the pushing shortest member 124 extends along a length of the pressing cartridge 121, and a ratio of a distance D1 between an inner sidewall 1211 of the pressing cartridge 121 and the pushing member 124 and a diameter D2 of the pushing member 124 is in a range of about 1:1500 to about 1:4500, and the polymeric material melted by the melting unit 120 may be uniformed. In some embodiments, a shortest distance D1 between an inner sidewall 1211 of the pressing cartridge 121 and the pushing member 124 is substantially equal to or less than 0.3 mm. In some embodiments, the shortest distance D1 between the inner sidewall 1211 of the pressing cartridge 121 and the pushing member 124 ranges between 0.01 and 0.05 mm.

The mixing unit 130 is configured to receive the polymeric material from the melting unit 120 and configured to mix the polymeric material with a blowing agent and to form a mixture of the polymeric material and the blowing agent. The mixing unit 130 includes a hollow mixing cartridge 131, a second feeding passage 132, a second discharging passage 133, and a mixing rotor 134.

The second feeding passage 132 and the second discharging passage 133 are respectively disposed at two ends of the mixing cartridge 131. In some embodiments, the second feeding passage 132 is configured to deliver the polymeric material. In some embodiments, the second discharging passage 133 is configured to discharge the mixture.

The mixing rotor 134 is configured to mix the polymeric material with the blowing agent to form a mixture in the mixing cartridge 131. In some embodiments, the mixing rotor 134 is disposed in the mixing cartridge 131. In some embodiments, the mixing rotor 134 is disposed in the mixing cartridge 131 between the second feeding passage 132 and the second discharging passage 133, so as to agitate the mixture in the mixing cartridge. The mixing rotor 134 is rotatable to mix the polymeric material with the blowing agent and to convey the mixture of the polymeric material and the blowing agent from the second feeding passage 132 to the second discharging passage 133. In some embodiments, the mixing rotor 134 is immovable in a direction parallel to the longitudinal axis of the mixing cartridge 131.

In some embodiments, a length of the mixing rotor 134 extends along a length of the hollow mixing cartridge 131, and a ratio of a shortest distance D3 between an inner sidewall 1311 of the hollow mixing cartridge 131 and the mixing rotor 134 and a diameter D4 of the mixing rotor 134 is in a range of about 1:1500 to about 1:4500, and the mixture prepared by the extruding system 10 may be even and uniformed. In some embodiments, the mixture may be divided in to a plurality of portions, and a ratio of the blowing agent to the polymeric material of each portion of the mixture prepared by the extruding system 10 is substantially constant. In some embodiments, a ratio of the polymeric material to the blowing agent in a first portion of the mixture is substantially equal to a ratio of the polymeric material to the blowing agent in a second portion of the mixture. In some embodiments, the shortest distance D3 between the inner sidewall 1311 of the hollow mixing cartridge 131 and the mixing rotor 134 is substantially equal to or less than 0.3 mm. In some embodiments, the shortest distance D3 between the inner sidewall 1311 of the hollow mixing cartridge 131 and the mixing rotor 134 ranges between 0.01 and 0.09 mm.

Figure 2A:
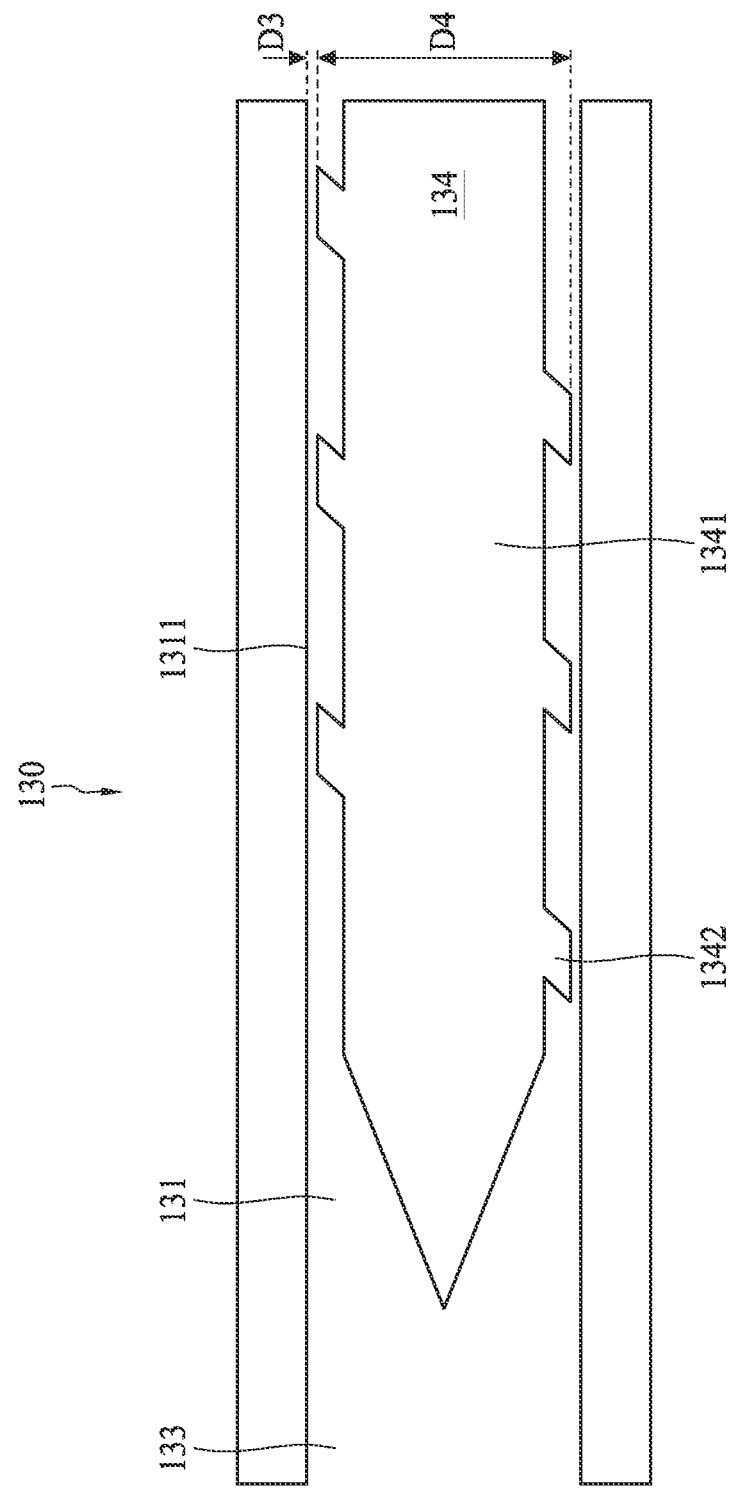
FIG. 2A is an enlarged view of a portion of an injection molding system enclosed by a dash line in FIG. 2 according to one embodiment of the present invention.

FIG. 2A is an enlarge view of a portion of the extruding system according to aspects of the present disclosure in some embodiments. To enable the melted polymeric material and the blowing agent to mix uniformly in the mixing cartridge 131, in some embodiments, referring to FIGS. 2 and 2A, the mixing rotor 134 further includes a column-like body 1341 in a cylindrical shape and rotatably disposed in the mixing cartridge 131, and a groove portion 1342 annularly arranged on the periphery of the column-like body 1341. Therefore, when the column-like body 1341 rotates, the polymeric material and the blowing agent are agitated by the groove portion 1342, so as to achieve a desired mixing effect. In some embodiments, the shortest distance D3 is a shortest distance between the groove portion 1342 and the inner sidewall 1311 of the hollow mixing cartridge 131.

In some embodiments, when the shortest distance D3 is a shortest distance between the groove portion 1342 and the inner sidewall 1311 of the hollow mixing cartridge 131, the shortest distance D3 ranges between 0.01 and 0.09 mm. In some embodiments, the diameter D4 of the mixing rotor 134 ranges between the 45 to 75 mm. Table 1 lists the shortest distance D3, the diameter D4 and the corresponding ratio of the a shortest distance D3 distance between the groove portion 1342 and the inner sidewall 1311 of the hollow mixing cartridge 131 and a diameter D4 of the mixing rotor 134.

TABLE 1

| | diameter D4 (mm) | | | | | | | |
|---|---|---|---|---|---|---|---|---|
| | 45 | | 55 | | 65 | | 75 | |
| shortest distance D3 (mm) | 0.01 | 0.02 | 0.02 | 0.03 | 0.03 | 0.04 | 0.04 | 0.05 |
| D4/D3 | 4500 | 2250 | 2750 | 1833 | 2167 | 1625 | 1875 | 1500 |

Figure 2B:
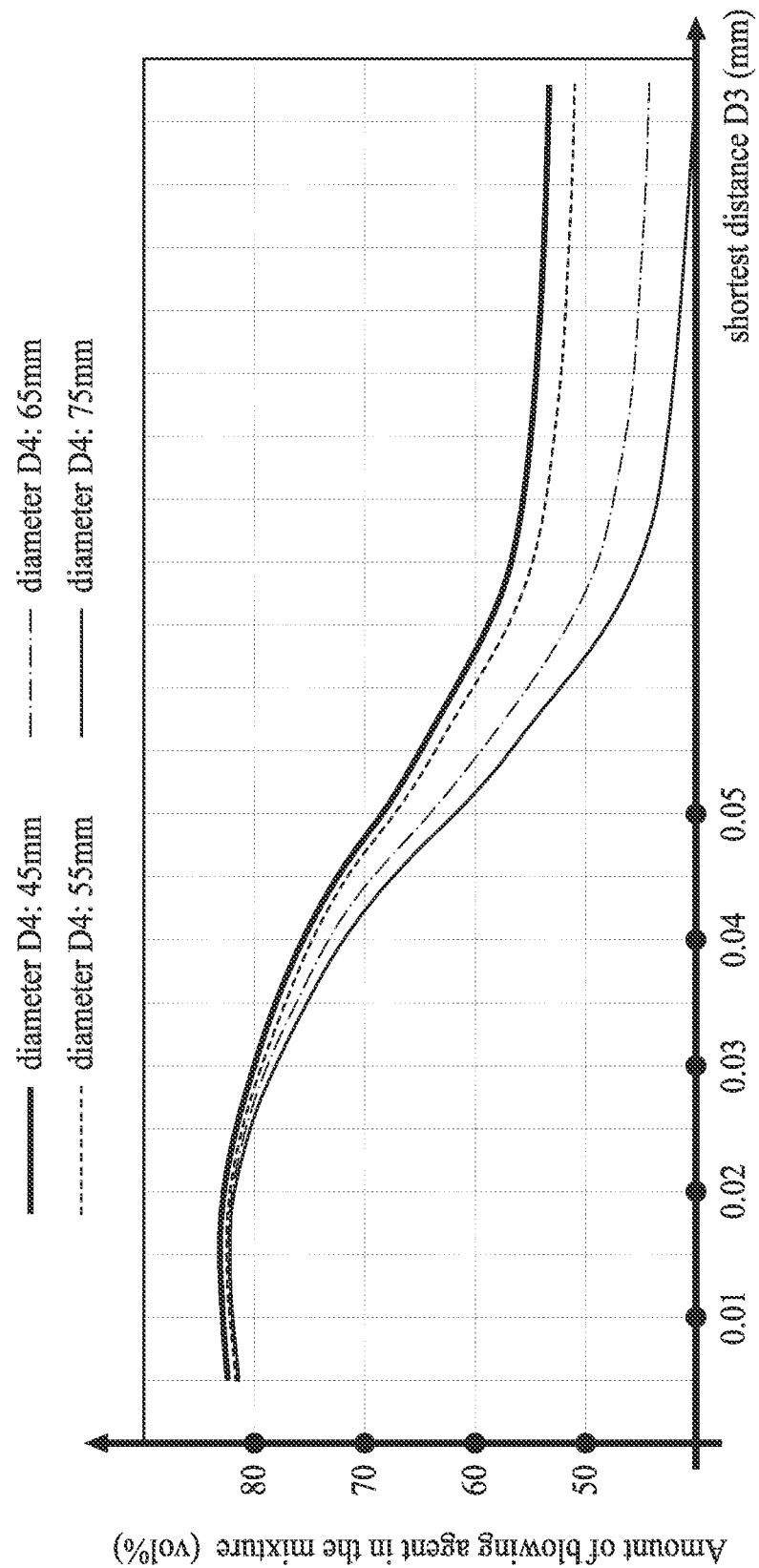
FIG. 2B is a chart illustrating the behavior of the amount of blowing agent in the mixture versus the shortest distance according to one embodiment of the present invention.

In some embodiments, when the shortest distance D3 is substantially less than 0.01 mm, the blowing agent in a predetermined amount of the mixture is substantially greater than 0.8 per cm$^3$, as shown in FIG. 2B. In some embodiments, if the blowing agent in the predetermined amount of the mixture is substantially greater than 0.8 per cm$^3$, a bubble density in the predetermined amount of the mixture after foaming is substantially greater than 180000 per cm$^3$.

Figure 2C:
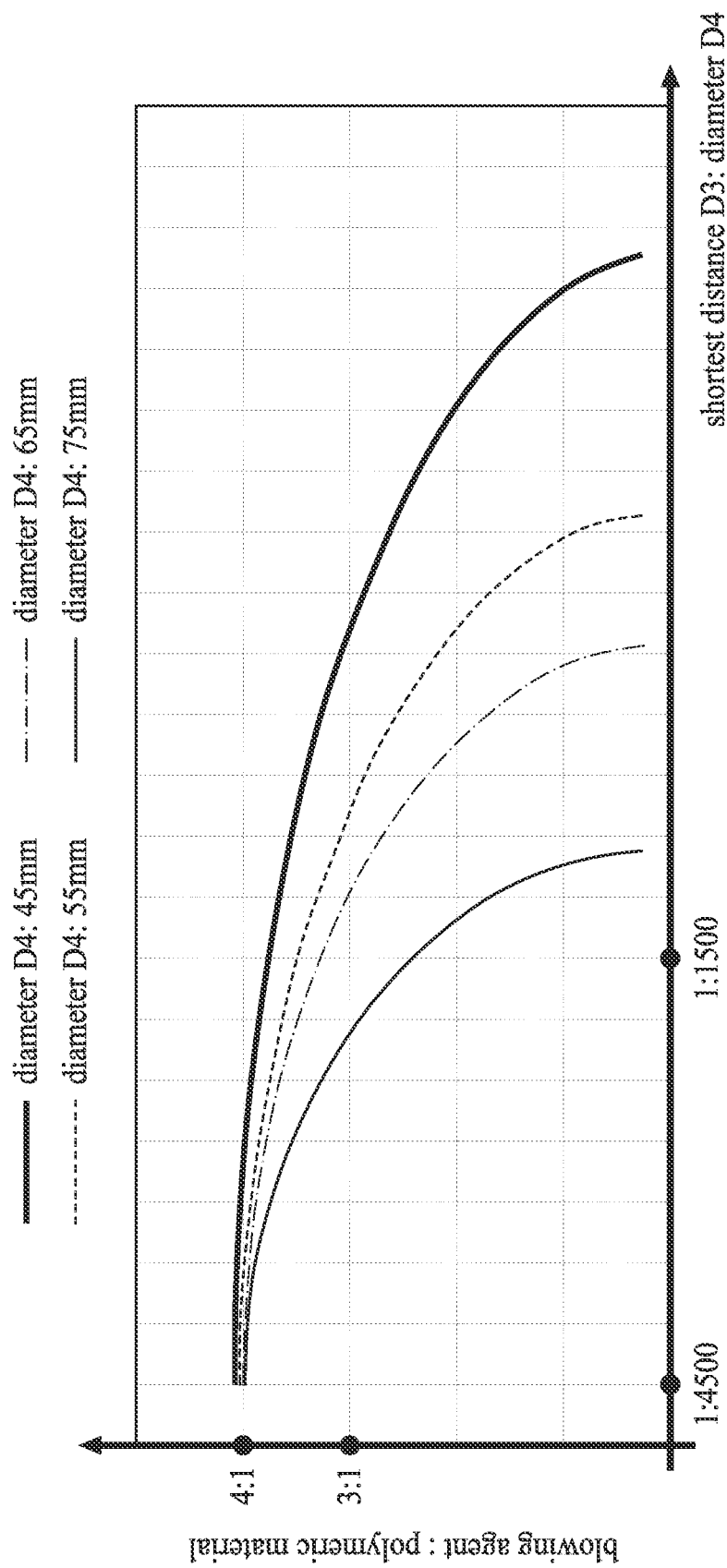
FIG. 2C is a chart illustrating the behavior of the ratio of the blowing agent to the polymeric material versus the ratio of the shortest distance to the diameter of the mixing rotor according to one embodiment of the present invention.

In some embodiments, when the ratio of the shortest distance D3 to the distance D4 ranges between 1:1500 and 1:4500, an evenness of the blowing agent to the polymeric material is optimized. In other words, a mixing of the blowing agent and the polymeric material by the mixing rotor 134 is even and uniform. In some embodiments, when the ratio of the shortest distance D3 to the distance D4 ranges between 1:1500 and 1:4500, a ratio of the blowing agent to the polymeric material in a predetermined amount of the mixture ranges between 4:1 to 3:1 as shown in FIG. 2C. In some embodiments, the ratio of the blowing agent to the polymeric material in the predetermined amount of the mixture is about 1:1. In some embodiments, if the ratio of the blowing agent to the polymeric material in the predetermined amount of the mixture ranges between 4:1 and 3:1 ratio of bubbles to the polymeric material in the predetermined amount of the mixture after foaming also ranges between 4:1 and 3:1. In some embodiments, the ratio of the bubbles to the polymeric material in the predetermined amount of the mixture after foaming is about 4:1.

In some embodiments, the melting unit 120 includes a hollow pressing cartridge 121 configured to accommodate the polymeric material and having a first pressure, and the mixing unit 130 includes a hollow mixing cartridge 131 having a second pressure. In some embodiments, in order to prevent backflow, the first pressure is greater than the second pressure. In some embodiments, the polymeric material is drawn from the melting unit 120 toward the mixing unit 130 by the difference between the first pressure and the second pressure.

The blowing agent supply unit 140 is connected to the mixing unit 130 and configured to convey the blowing agent into the mixing unit 130. In some embodiments, the blowing agent supply unit 140 is positioned between the first flow control element 161 and the second flow control element 162. In some embodiments, the blowing agent supply unit 140 is disposed proximal to the first flow control element 161 and distal to the second flow control element 162.

In some embodiments, a blowing agent source (not shown) is connected to the blowing agent supply unit 140 and is configured to supply any type of blowing agent known to those of ordinary skill in the art. In some embodiments, the blowing agent is in the supercritical fluid state after being introduced into the mixing unit 130 by the blowing agent supply unit 140.

In some embodiments, the first flow control element 161 is disposed at a first port 171 that connects the melting unit 120 to the mixing unit 130. The first port 171 is configured to introduce the polymeric material from the melting unit 120 into the mixing unit 130. The first port 171 is located between the melting unit 120 and the mixing unit 130. In some embodiments, the first port 171 is configured to introduce the polymeric material from the pressing cartridge 121 of the melting unit 120 into the mixing cartridge 131 of the mixing unit 130. In some embodiments, the polymeric material can be conveyed and/or drawn from the melting unit 120 to the mixing unit 130 through the first port 171 by a pressure difference between the first pressure and the second pressure.

In some embodiments, the first flow control element 161 is disposed between the melting unit 120 and the mixing unit 130 and is configured to control flow of the polymeric material from the melting unit 120 to the mixing unit 130. The first flow control element 161 may be a valve, a movable cover or the like.

In some embodiments, the first flow control element 161 is configured to switch between an open configuration and a closed configuration. The open configuration of the first flow control element 161 allows the polymeric material to flow from the melting unit 120 into the mixing unit 130, and the closed configuration of the first flow control element 161 prevents the polymeric material from flowing from the mixing unit 130 back to the melting unit 120.

In some embodiments, the first flow control element 161 is configured to maintain a pressure difference between the melting unit 120 and the mixing unit 130. In some embodiments, the first flow control element 161 is configured to maintain a pressure difference between the melting unit 120 and the mixing unit 130 by switching between the open configuration and the closed configuration, so that the polymeric material is not able to flow from the mixing cartridge 131 of the mixing unit 130 back to the pressing cartridge 121 of the melting unit 120. In some embodiments, the first flow control element 161 is configured to adjust the first pressure and/or the second pressure in order to maintain the pressure difference between the first pressure and the second pressure. In some embodiments, the first flow control element 161 is in the closed configuration when the first pressure is similar to the second pressure.

In some embodiments, the injection unit 150 is configured to receive the mixture discharged from the second discharging passage 133 of the mixing unit 130 and to discharge the mixture out of the injection unit 150. In some embodiments, the injection unit 150 is configured to inject the mixture, and the discharging channel 20 is communicable with the injection unit 150.

In some embodiments, the injection unit 150 includes a hollow metering cartridge 151 configured to accommodate the mixture. The metering cartridge 151 has a hollow inner space 1511, wherein the inner space 1511 is in communication with the second discharging passage 133 and configured to accommodate the mixture. The injection unit 150 further includes a connecting passage 152 in communication with the inner space 1511 of the metering cartridge 151 and a discharging member 153 slidably disposed in the inner space 1511 of the metering cartridge 151 and configured to discharge the mixture out of the metering cartridge 151 through an outlet 154.

In some embodiments, referring back to FIG. 1, one discharging channel 20 corresponds to one extruding system 10. The mixture is flowed from one extruding system 10 or one injection outlet 12 into one discharging channel 20. In some embodiments, one injection unit 150 corresponds to several discharging channels 20. In some embodiments, a plurality of discharging channels 20 are connected to or communicable with the injection outlet 12. In some embodiments, each of the discharging channels 20 is attached to the outlet 154 of the injection unit 150. The number of the discharging channels 20 may be adjusted according to the property of the mixture. The discharging channels 20 are extended parallel to each other and arranged adjacent to each other. In some embodiments, each discharging channel 20 may accommodate different amounts of the mixture injected from the outlet 154. The discharging channels 20 may discharge the same or different amount of the mixture into the molding device 30a. In some embodiments, each discharging channel 20 may operate under different temperatures.

Each discharging channel 20 has an outlet 21 away from the injection unit 150. In some embodiments, the outlets 21 can have different widths or diameters, and thus the outlets 21 can have different flow rates of the mixture. In some embodiments, the outlets 21 can inject different amounts of the mixture.

The discharging channels 20 may be moved, extended, or retracted synchronously or separately. In some embodiments, the outlets 21 of the discharging channels 20 may be extended into and be retracted from the molding device 30a.

The number of the molding devices 30a may be adjusted according to requirements. In some embodiments, one molding device 30a corresponds to one discharging channel 20. The mixture can be flowed from the extruding system 10 into one molding device 30a through one discharging channel 20. FIG. 1 illustrates two discharging channels 20 corresponding to the molding device 30a for clarity and simplicity, but such example is intended to be illustrative only, and is not intended to be limiting to the embodiments. A person ordinarily skilled in the art would readily understand that any suitable number of the discharging channels 20 may be utilized.

Further, FIG. 1 illustrates only two molding devices 30a, 30b for clarity and simplicity, but such example is intended to be illustrative only, and is not intended to be limiting to the embodiments. A person ordinarily skilled in the art would readily understand that any suitable number of the molding devices 30a, 30b may be utilized, and all such combinations are fully intended to be included within the scope of the embodiments. Additionally, the molding devices 30a, 30b are illustrated as having similar features, this is intended to be illustrative and is not intended to limit the embodiments, as the molding devices 30a, 30b may have similar structures or different structures in order to meet the desired functional capabilities.

Each molding device 30a, 30b includes a mold cavity 31 and a feeding port 35 communicable with the mold cavity 31 and correspondingly engageable with the outlet 21.

In some embodiments, each molding device 30a, 30b includes an upper mold base 34 and a mold under the upper mold base 34. In some embodiments, the mold includes an upper mold 32 under the upper mold base 34, a lower mold 33 opposite to the upper mold 32, and a mold cavity 31 defined by the upper mold 32 and lower mold 33. FIG. 1 illustrates each of the molding devices 30a, 30b includes one mold for clarity and simplicity, but such example is intended to be illustrative only, and is not intended to be limiting to the embodiments. A person ordinarily skilled in the art would readily understand that each of the molding devices 30a, 30b may include several molds under the upper mold base 34.

In some embodiments, the mold cavity 31 is defined by the upper mold 32 and the lower mold 33. In some embodiments, the upper mold 32 and the lower mold 33 are complementary with and separable from each other. The lower mold 33 includes a lower mold cavity, and the upper mold 32 includes an upper mold cavity opposite to the lower mold cavity. In some embodiments, the mold cavity 31 is formed by the upper mold cavity and the lower mold cavity. FIG. 1 illustrates one mold includes one mold cavity 31 for clarity and simplicity, but such example is intended to be illustrative only, and is not intended to be limiting to the embodiments. A person ordinarily skilled in the art would readily understand that one mold may include several mold cavities 31. For example, one mold includes two mold cavities 31 defined by one upper mold 32 and one lower mold 33.

Figure 3:
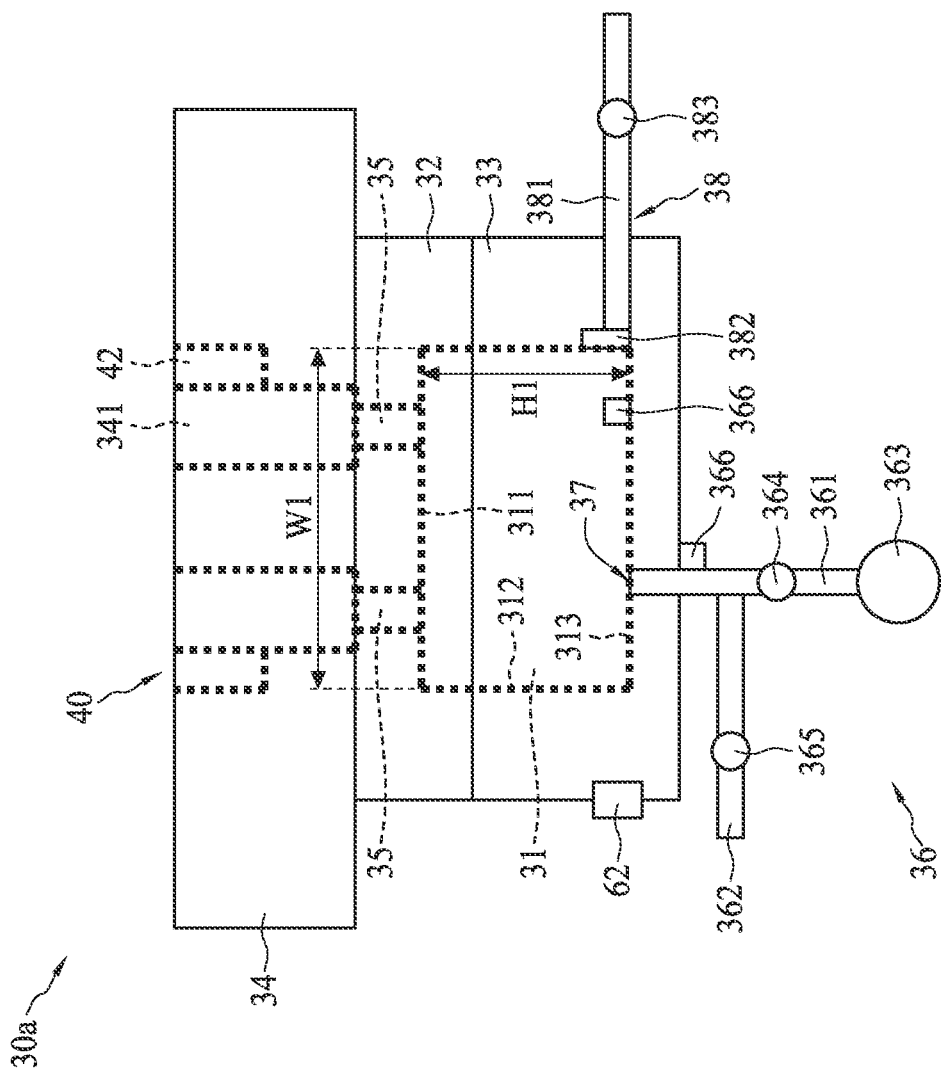
FIG. 3 is a schematic diagram of a portion of an injection molding system in FIG. 1 according to one embodiment of the present invention.

FIG. 3 is a schematic diagram view of a molding device 30a according to one embodiment of the present invention. In some embodiments, referring to FIG. 3, each of the molding devices 30a, 30b further includes an inner top wall 311, an inner sidewall 312 and an inner bottom wall 313 opposite to the inner top wall 311. The inner top wall 311, the inner sidewall 312 and the inner bottom wall 313 defines the mold cavity 31, and the feeding ports 35 are in communication with the mold cavity 31 and disposed at the inner top wall 311. In some embodiments, an area of the inner top wall 311 is greater than an area of the inner sidewall 312. In some embodiments, a ratio of the area of the inner top wall 311 to the area of the inner sidewall 312 is in a range of about 2:1 to about 10:1. In some embodiments, a ratio of a width W1 of the inner top wall 311 to a height H1 of the inner sidewall 312 is in a range of about 2:1 to about 10:1. In some embodiments, the feeding ports 35 are in communication with the largest inner wall of the corresponding molding device 30a. 30b. In some embodiments, the feeding ports 35 are in communication with the inner top wall 311.

In some embodiments, referring to FIG. 1 and FIG. 3, at least one feeding port 35 is disposed at each of the molding devices 30a, 30b. Each feeding port 35 is communicable with the mold cavity 31 and correspondingly engageable with the outlet 21. In some embodiments, the feeding port 35 is disposed over the upper mold 32 or the lower mold 33 and is communicable with the mold cavity 31, the upper mold cavity or the lower mold cavity. FIG. 1 illustrates two feeding ports 35 are included in one mold for clarity and simplicity, but such example is intended to be illustrative only, and is not intended to be limiting to the embodiments. A person ordinarily skilled in the art would readily understand that one mold may include one or more feeding ports 35 communicable with one mold cavity 31.

The feeding port 35 is configured to dock the outlet 21. In some embodiments, several feeding ports 35 are disposed at the molding device 30a, 30b and configured to dock the corresponding outlets 21. In some embodiments, the discharging channels 20 are received by the upper mold base 34. Each discharging channel 20 is at least partially surrounded by the upper mold base 34, and the outlets 21 are docked to the feeding ports 35 respectively. The mixture can be transported from the discharging channel 20 into the mold cavity 31 through the outlet 21 and the feeding port 35. In some embodiments, the feeding ports 35 can have different widths or diameters. In some embodiments, the mixture is injected into the mold cavity 31 and then a foamed polymeric article is formed in the mold cavity 31 after a period of time.

In some embodiments, the upper mold base 34 includes openings 341 configured to receive the corresponding discharging channels 20. Each of the openings 341 extends through the upper mold base 34. The upper mold base 34 may be mounted on the upper mold 32 by a screw, a clamp, a fastening means or the like. In some embodiments, the material of the upper mold base 34 is same as the material of the upper mold 32. In some embodiments, a width of the upper mold base 34 is greater than that of the upper mold 32 or the lower mold 33. In some embodiments, the number of openings 341 corresponds to the number of the discharging channels 20.

In some embodiments, a length L of the discharging channel 20 is related to some factors, such as a thickness H2 of the upper mold base 34, a clamping force for holding the molding device 30a, 30b, properties of material for making the molding device 30a, 30b, fluidity of the mixture, temperature of the mixture, or the like. In some embodiments, the thickness H2 of the upper mold base 34 is less than the length L of the discharging channel 20.

In order to keep the fluidity and temperature of the mixture within a predetermined range, in some embodiments, the length L of each discharging channel 20 is reduced as much as possible but is greater than the thickness H2 of the upper mold base 34.

Each of the molding devices 30a, 30b further includes one or more pressure-regulating systems 36. In some embodiments, each of the molding devices 30a, 30b may include different numbers of the pressure-regulating systems 36 or no pressure-regulating system 36. In some embodiments, a junction point 37 is in connection with the mold cavity 31. In some embodiments, the inner sidewall 312 or the inner bottom wall 313 of the mold cavity 31 includes the junction point 37, In some embodiments, the junction point 37 is configured to allow a fluid or gas to enter into or exit from the mold cavity 31.

The pressure-regulating system 36 may include a first gas conduit 361, a second gas conduit 362, a gas source 363, a first valve 364, a second valve 365, and a pressure-sensing unit 366. In some embodiments, one end of the first gas conduit 361 is coupled to the inner sidewall 312 or the inner bottom wall 313 of the molding device 30a, 30b. In some embodiments, one end of the first gas conduit 361 is coupled to the junction point 37, and the other end of the first gas conduit 361 is coupled to the gas source 363. In some embodiments, the gas source 363 is configured to supply a fluid or gas, in which a suitable fluid or gas may be supplied depending on the needs for example, the fluid or gas may be air, inert gas, etc., but the present invention is not limited thereto.

The location, shape and number of the junction point 37 are not particularly limited, and may be adjusted depending on the needs. In some embodiments, the junction point 37 is a hole. In some embodiments, the junction point 37 is disposed at the inner sidewall 312 or the inner bottom wall 313 of the molding device 30a, 30b and penetrates the lower mold 33, In some embodiments, the junction point 37 is configured to supply gas and discharge gas, wherein when the first valve 364 is open and the second valve 365 is closed, the fluid or gas is supplied to the mold cavity 31; when the first valve 364 is closed and the second valve 365 is open, at least a portion of the fluid or gas in the mold cavity 31 is discharged.

In some embodiments, the feeding ports 35 are disposed at the inner top wall 311 or the inner sidewall 312 of the molding device 30a, 30b. In some embodiments, the feeding port 35 and the junction point 37 are disposed oppositely with respect to the mold cavity 31; as an example but not limitation, the feeding port 35 is disposed at the inner top wall 311, and the junction point 37 is disposed at the inner bottom wall 313. In some embodiments, the feeding ports 35 are disposed at the inner top wall 311, and the junction point 37 is disposed at the inner sidewall 312. In some embodiments, the feeding port 35 is disposed at the inner sidewall of the upper mold 32, and the junction point 37 is disposed at the inner sidewall 312 and is located at another side opposite to the feeding port 35. In some embodiments, the feeding port 35 is away from the junction point 37.

The first valve 364 is disposed at the first gas conduit 361 and is configured to control whether the gas from the gas source 363 enters the mold cavity 31 through the first gas conduit 361 and the junction point 37. The second gas conduit 362 coupled to the mold and in communication with the mold cavity 31. In some embodiments, the second gas conduit 362 is coupled to the junction point 37. The second valve 365 is disposed at the second gas conduit 362 and is configured to control whether the gas from the mold cavity 31 is discharged via the junction point 37 through the second gas conduit 362.

In some embodiments, the second gas conduit 362 is coupled to the first gas conduit 361 and the junction point 37. In some embodiments, one end of the second gas conduit 362 is in communication with a space with a pressure lower than the pressure in the mold cavity 31; for example, an external environment or a negative pressure space; however, the present invention is not limited thereto. The location at which the second gas conduit 362 connects with the first gas conduit 361 is not particularly limited; for example, the two may be connected at one end adjacent to an end where the first gas conduit 361 connects to the junction point 37. In some embodiments, the first valve 364 and the second valve 365 are not simultaneously open.

The pressure-sensing unit 366 is configured to sense the pressure in the mold cavity 31. In some embodiments, the properties of foamed polymers are affected by the pore size and distribution across the polymer, whereas the pore size and distribution are related to the temperature, pressure, and feeding rate. The pressure-sensing unit 366 is not limited to any particular type, as long as it can sense the pressure and provide pressure information after sensing the pressure in the mold cavity 31. The pressure-regulating system 36 changes the condition at which the gas exits from/enters into the mold cavity 31 in accordance with the pressure information, so as to adjust the pressure in the mold cavity 31, in such a manner that the foamed polymeric article thus obtained has the desired predetermined shape and property.

In some embodiments, the pressure-sensing unit 366 is disposed in the mold cavity 31, the first gas conduit 361 or the second gas conduit 362. In some embodiments, the pressure-sensing unit 366 is disposed in the mold cavity 31 and is away from the feeding port 35. In some embodiments, the pressure-regulating system 36 has a plurality of pressure-sensing units 366. The number and location of the plurality of pressure-sensing units 366 are not particularly limited, for example, they can be arranged at the inner sidewall of the mold cavity 31 and spaced from each other, and/or anywhere in the first gas conduit 361, and/or anywhere in the second gas conduit 362; however, the present invention is not limited thereto.

In some embodiments, the molding device 30a, 30b further includes a venting unit 38 configured to adjust the pressure in the mold cavity 31, In some embodiments, after the mixture is injected into the mold cavity 31, the pressure in the mold cavity is increased, and the venting unit 38 may vent some gas to ensure that the mold cavity 31 is kept within a suitable pressure range. In some embodiments, the venting unit 38 is configured to adjust or reduce the pressure in the mold cavity 31.

In some embodiments, the venting unit 38 is in communication with the mold cavity 31. In some embodiments, the feeding port 35 and the venting unit 38 are disposed oppositely with respect to the mold cavity 31; as an example but not limitation, the feeding port 35 is disposed at the inner top wall 311, and the venting unit 38 is disposed at the inner bottom wall 313. In some embodiments, the feeding ports 35 are disposed at the inner top wall 311, and the venting unit 38 is disposed at the inner sidewall 312. In some embodiments, the feeding port 35 is away from the venting unit 38. In some embodiments, the feeding port 35 is disposed at the inner sidewall 312 or the inner top wall 311, and the pressure-regulating system 36 and the venting unit 38 are disposed at the inner bottom wall 313.

In some embodiments, the venting unit 38 includes a gas conduit 381 and a shutter 382 configured to allow the gas to flow into the gas conduit 381 and avoid the overflow of the mixture into the gas conduit 381 at the same time. The shutter 382 may control the amount of gas that enters the gas conduit 381 from the mold cavity 31. In some embodiments, the venting unit 38 further includes a valve 383. One end of the gas conduit 381 is coupled to the mold cavity 31, and the other end of the gas conduit 381 is in communication with the space with a pressure lower than the pressure in the mold cavity 31, such as an external environment or a negative pressure space. When the valve 383 is closed, the gas stays in the mold cavity 31, when the valve 383 is opened, the gas may enter the gas conduit 381 and pass through the valve 383. In some embodiments, the venting unit 38 includes a plurality of gas conduits 381, and the gas conduits 381 are coupled to the same valve 383. The location and number of the venting units 38 are not particularly limited, and may be adjusted depending on the needs. In some embodiments, each of the molding devices 30a, 30b may include a different number of the venting units 38 or no venting unit 38. In some embodiments, the control system 60 controls the venting unit 38 in real time.

In some embodiments, the shutter 382 may include a filter (not shown) to allow gas to enter into the gas conduit 381. The pore size of the filter may be adjusted according to the needs as long as the gas may pass through the filter and the mixture or the foamed polymeric article may not pass through the filter. In some embodiments, the filter has a plurality of slits (not shown). The size and shape of the slits may be similar or different. In some embodiments, the filter has a plurality of pores (not shown). The size and shape of the pores may be similar or different.

In some embodiments, the injection molding system 100 further includes a control system 60. The control system 60 is configured to control the extruding system 10, the discharging channels 20, and the molding devices 30a, 30b. In some embodiments, the control system 60 automatically controls the extruding system 10, the discharging channels 20, and the molding devices 30a, 30b in real time. In some embodiments, the control system 60 is communicable with the monitoring module 180 of the extruding system 10 in real time.

In some embodiments, the control system 60 includes a central processor 61 and a plurality of sensors 62 electrically connected to or communicable with the central processor 61. In some embodiments, the sensors 62 are placed throughout the injection molding system 100 and configured to sense at least one processing condition (e.g., flow rate or viscosity of the mixture through the discharging channels 20, an amount of the mixture discharged from the discharging channel s 20, a pressure inside the mold cavity 31, etc.) at a predetermined position of the injection molding system 100 (e.g., the sequence of extruding to each of the molding devices 30a, 30b, the alignment of the discharging channels 20 to one of the molding devices 30a, 30b, the outlet 21, the feeding port 35, and the mold cavity 31, etc.). For example, at least one sensor 62 is installed at the outlet 21 for sensing the processing condition at the outlet 21. In some embodiments, the sensor 62 is configured to detect the processing condition and transmit a signal or data based on the processing condition detected to the central processor 61 for further analysis.

In some embodiments, the control system 60 controls which molding devices 30a, 30b the discharging channels 20 are docked to. In some embodiments, the cables 63 are electrically connected between the control system 60 and the extruding system 10, the discharging channels 20, and the molding devices 30a, 30b. The cables 63 are configured to transmit the signal from the molding devices 30a, 30b to the extruding system 10 and the discharging channels 20.

In some embodiments, the control system 60 is configured to process the pressure information detected by the pressure-sensing unit 366, and configured to adjust the mixing condition of the extruding system 10 and the extruding amount and timing of the discharging channels 20. In some embodiments, the pressure-sensing unit 366 provides the pressure information to the control system 60, and the control system 60 adjusts the first valve 364 and the second valve 365 in accordance with the pressure information. In some embodiments, the control system 60 adjusts the condition at which the gas enters into/exits from the mold cavity 31 in real time in accordance with the pressure information, and adjust the timing and amount of the mixture injected from the discharging channels 20 into the mold cavity 31, so that during the injection molding process, the amount and rate of injection is within a suitable or predetermined range, and the pressure in the mold cavity 31 is within a suitable or predetermined pressure range at all times. In some embodiments, the control system 60 further controls the feeding condition of the feeding port 35 and the gas supply condition of the gas source 363. In some embodiments, the control system 60 and the first valve 364, the second valve 365, the pressure-sensing unit 366 and the feeding port 35 are electrically connected.

In some embodiments, the molding devices 30a, 30b are arranged in a line, a row, a column, an arc, a curve or any other suitable arrangements. In some embodiments, one of the molding devices 30a, 30b is adjacent to another one of the molding devices 30a, 30b. In some embodiments, the mixture is injected from the extruding system 10 into the molding devices 30a, 30b in a sequence. In some embodiments, the extruding system 10 and the discharging channels 20 are disposed over one of the plurality of molding devices 30a, 30b.

In some embodiments, the discharging channels 20 are movable relative to each of the plurality of molding devices 30a, 30b. In some embodiments, the molding devices 30a, 30b are stationary. In some embodiments, each of the plurality of molding devices 30a, 30b is movable relative to the extruding system 10 and the discharging channels 20. In some embodiments, the extruding system 10 and the discharging channels 20 are stationary.

The supporting device 40 configured to facilitate the engagement of the discharging channels 20 to each of the plurality of molding devices 30a, 30b can be disposed at any suitable position on the injection molding system 100. In some embodiments, the supporting device 40 is configured to support the discharging channel 20. In some embodiments, the supporting device 40 is used to prevent separation of the discharging channels 20 and the corresponding molding devices 30a, 30b during the injection of the mixture. In some embodiments, the control system 60 controls the supporting device 40 in real time.

Figure 4:
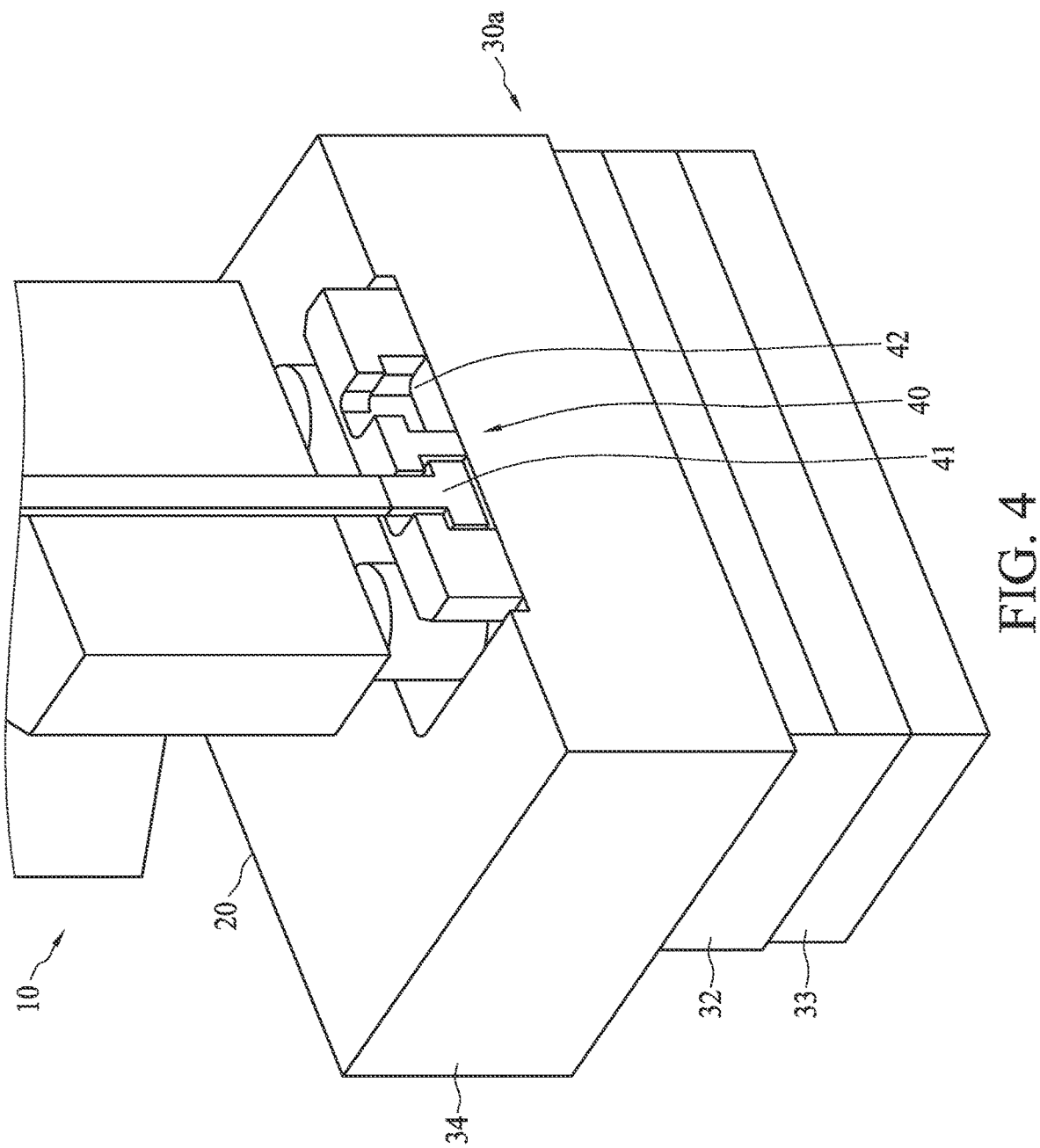
FIG. 4 is a schematic diagram of a portion of the injection molding system in FIG. 1 according to one embodiment of the present invention.

FIG. 4 is a schematic diagram of a portion of the injection molding system 100 according to one embodiment of the present disclosure. In some embodiments, referring to FIG. 4, the supporting device 40 includes first and second elements 41, 42 configured to engage with each other, wherein the first element 41 protrudes from the extruding system 10 or the discharging channel 20, and the second element 42 is disposed on each of the plurality of molding devices 30, but the disclosure is not limited thereto. In some embodiments, the first and second elements, 41, 42 can be clamped to each other; for example, the second element 42 is configured to receive the first element 41.

In some embodiments, the supporting device 40 is disposed above the mold cavity 31 of the molding device 30a, 30b, in some embodiments, the first element 41 is disposed on the discharging channel 20, and the second element 42 is disposed on each molding devices 30a, 30b. In some embodiments, the second element 42 is disposed on the upper mold base 34 of the molding device 30a, 30b. In some embodiments, the first element 41 is a part of the extruding system 10 or the discharging channel 20, while the second element 42 is a part of the molding device 30. In some embodiments, the first element 41 is a part of the extruding system 10 and disposed adjacent to the discharging channels 20, and the second element 42 is disposed above or facing toward the upper mold base 34 of the molding device 30a, 30b. In some embodiments, the first element 41 and the second element 42 can engage with each other, thereby tightly engaging the discharging channels 20 with the upper mold base 34 of the molding device 30.

In some embodiments, in order to prevent separation of the extruding system 10 and the molding device 30a, 30b during the injection of the mixture, the engaged first element 41 is subjected to a force to against the second element 42. The force may be equal to or greater than a threshold. The threshold may be adjusted according to the pressure in the mold cavity 31 and the diameter of the outlet 21, or according to other factors.

The position and number of the first element 41 may be adjusted according to requirements, and are not particularly limited. The position and number of the second element 42 may also be adjusted according to requirements, and are not particularly limited. In some embodiments, the position and number of the second element 42 correspond to the position and number of the first element 41. In an embodiment, the first element 41 can be disposed at any suitable position on the discharging channel 20, and the second element 42 can be disposed at any suitable position on the molding device 30. In some embodiments, the second element 42 is disposed above the upper mold 32.

Figure 5:
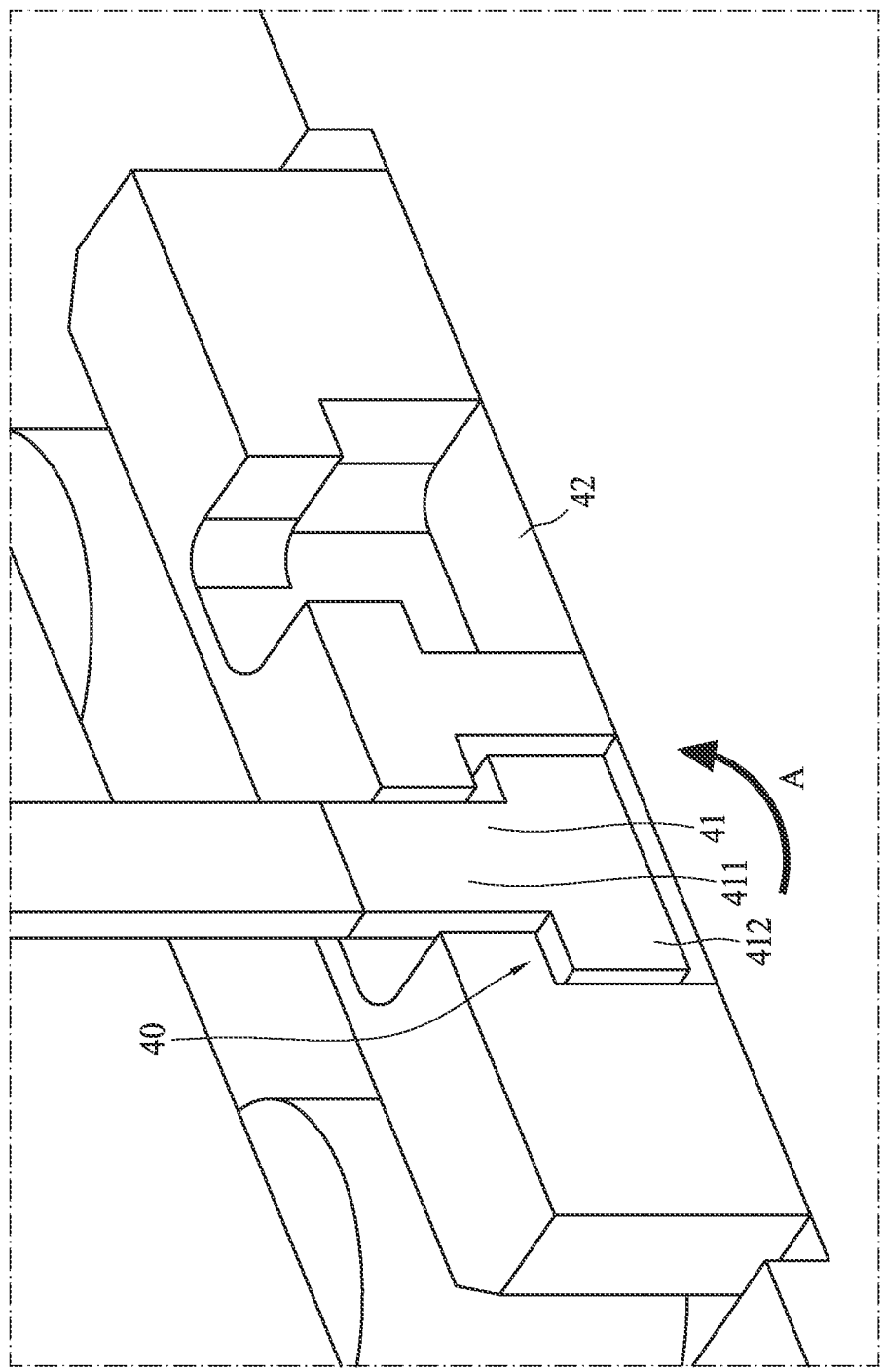
FIG. 5 is a schematic diagram of a portion of the injection molding system in FIG. 1 according to one embodiment of the present invention.

FIG. 5 is a schematic diagram of a portion of the injection molding system 100 according to one embodiment of the present invention. In some embodiments, referring to FIG. 5, the supporting device 40 can be in either of two states, a locked state and an unlocked state. In the unlocked state, the first element 41 enters the corresponding second element 42 but has not yet been locked with the second element 42. In other words, the first element 41 can still be withdrawn from the second element 42 when the supporting device 40 is in the unlocked state. In the locked state, the first element 41 enters and locks with the corresponding second element 42, such that the first element 41 cannot be withdrawn from the second element 42. FIG. 5 illustrates the supporting device 40 in the locked state. The supporting device 40 can be operated and controlled manually or automatically. The supporting device 40 can be switched between two states manually or automatically.

In some embodiments, the first element 41 is rotatably fixed to the extruding system 10. In some embodiments, the first element 41 includes an elongated portion 411 and an arm portion 412. The elongated portion 411 and the arm portion 412 are rotatable in a direction indicated by an arrow A. The elongated portion 411 is fixed to the extruding system 10 and extends in a first direction Z toward the upper mold 32. The arm portion 412 is coupled to the elongated portion 411 and extends in a second direction X substantially orthogonal to the first direction Z or in a third direction Y substantially orthogonal to the first direction Z. In some embodiments, the first element 41 has an inverted T shape. After the first element 41 enters the second element 42, the supporting device 40 is changed from the unlocked state to the locked state by rotation of the arm portion 412 of the first element 41. In some embodiments, the first element 41 is locked with the second element 42 by rotating the arm portion 412 of the first element 41 with about 90 degrees. FIG. 5 illustrates the arm portion 412 is locked with the second element 42 after rotating the arm portion 412 with about 90 degrees. As a result, the supporting device 40 is in the locked state, and the discharging channel 20 is tightly engaged with the molding device 30, and thus the injection of the mixture from the extruding system 10 and the discharging channel 20 to the molding device 30 can begin.

In some embodiments, the temperature of the discharging channel 20 is different from the temperature of the molding device 30a, 30b. The temperature of the discharging channel 20 is greater than that of the molding device 30a, 30b. In some embodiments, temperature of the discharging channel 20 ranges between 150° C. and 200° C., and temperature of the molding device 30a, 30b may range between 20° C. and 60° C.

Figure 6:
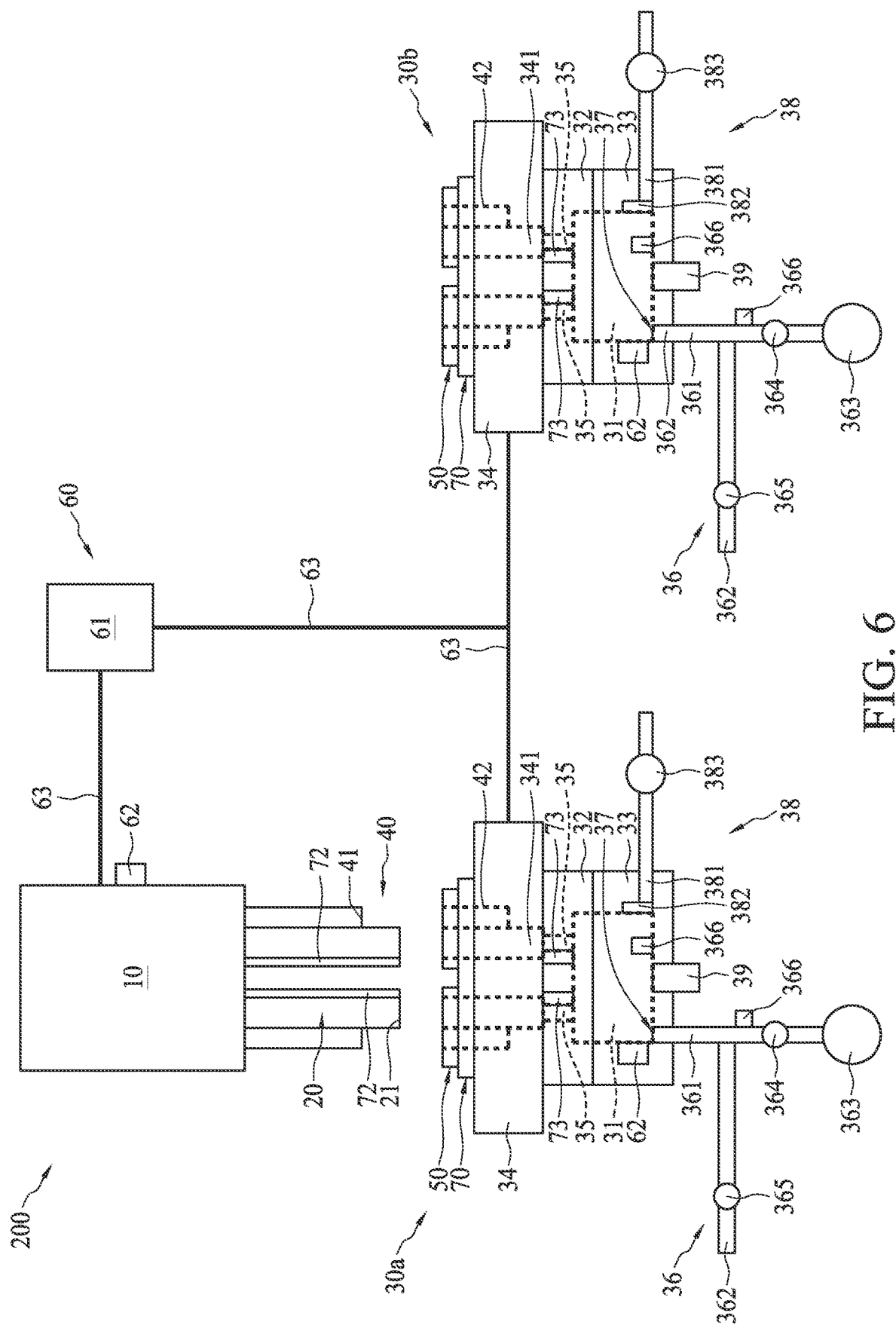
FIG. 6 is a schematic diagram of an injection molding system according to one embodiment of the present invention.

FIG. 6 is a schematic diagram of an injection molding system 200 according to one embodiment of the present invention. The injection molding system 200 includes an extruding system 10, discharging channels 20 and a plurality of molding devices 30a, 30b, The injection molding system 600 further includes covers 50, an insulator 70, and heaters 72, 73. Each of the molding devices 30a, 30b includes a mold cavity 31, an upper mold 32, a lower mold 33, an upper mold base 34, and a feeding port 35. Each of the molding devices 30a, 30b may further include, for example, a pressure-regulating system 36, a junction point 37, a venting unit 38, and/or a sealing element 39 as described above or shown in FIG. 1.

In some embodiments, referring to FIG. 6, in order to maintain the temperature difference between the discharging channels 20 and the molding devices 30a, 30b, the injection molding system 200 further includes an insulator 70 disposed between the discharging channels 20 and the molding devices 30a, 30b. In some embodiments, the insulator 70 is disposed between the discharging channels 20 and the upper mold base 34. In some embodiments, the insulator 70 is disposed on the upper mold base 34. In some embodiments, the insulator 70 is disposed between the outlet 21 and the feeding port 35.

Each of the discharging channels 20 may extend into the insulator 70 and is thereby partially surrounded by the insulator 70. In some embodiments, the insulator 70 includes openings 71 configured to receive the corresponding discharging channels 20. The openings 71 of the insulator 70 are aligned to the openings 341 of the upper mold base 34. Each of the openings 71 extends through the insulator 70. The insulator 70 may be mounted on the upper mold base 34, such as by a screw. The insulator 70 may include a non-thermally conductive material, such as a fiber glass. The insulator 70 may be comprised entirely of non-metal materials. In some embodiments, the insulator 70 has a melting point substantially greater a temperature of the mixture flowing through the discharging channel 20. In some embodiments, the melting point of the insulator 70 is substantially greater than 180° C.

In some embodiments, a width of the insulator 70 is less than that of the upper mold base 34. The thickness of the insulator 70 may be related to several factors, such as properties of materials for making the molding device 30 and the discharging channels 20, temperatures of the discharging channels 20 and the upper mold base 34, or the like. In some embodiments, the thickness of the insulator 70 is less than the thickness H2 of the upper mold base 34.

In some embodiments, in order to maintain the temperature difference between the discharging channels 20 and the molding devices 30 and maintain the fluidity of the mixture, the discharging channels 20 further include a heater 72 configured to keep the temperature of the discharging channels 20 within a predetermined range. In some embodiments, each of the discharging channels 20 includes the heater 72 disposed thereon. In some embodiments, each of the discharging channels 20 includes the heater 72 disposed around the outlet 21. In some embodiments, the heaters 72 may enter the openings 71 and the openings 341 together with the corresponding discharging channels 20 when the discharging channels 20 are engaged with the corresponding molding device 30a, 30b. The positions and number of the heaters 72 may be adjusted according to requirements, and are not particularly limited. Each of the discharging channels 20 may include a different number of heaters 72 or no heater 72. In some embodiments, the injection molding system 200 includes the extruding system 10, a single discharging channel 20, and a single molding device 30a, wherein the discharging channel 20 includes the heater 72 configured to adjust the temperature of the discharging channel 20.

In some embodiments, in order to maintain the fluidity of the mixture, each of the molding devices 30a, 30b further includes a heater 73 configured to maintain the temperature of the feeding port 35 within a predetermined range. In some embodiments, the heater 73 is disposed in the upper mold base 34 or the upper mold 32. In some embodiments, the heater 73 is disposed adjacent to the feeding port 35. The positions and number of the heaters 73 may be adjusted according to requirements, and are not particularly limited. In some embodiments, the feeding port 35 can be heated to a predetermined temperature (e.g. 200° C. or above) by the heater 73 during flowing of the mixture from the discharging channel 20 into the corresponding one of the molding device 30a, 30b, and then the feeding port 35 can be instantly cooled down to a predetermined temperature (e.g. 50° C. or lower) when the flowing of the mixture is accomplished. In some embodiments, the feeding port 35 is cooled down when the discharging channel 20 is withdrawn from the corresponding one of the molding device 30a, 30b. In some embodiments, such instant cooling can be implemented by turning off the heater 73 or turning on a cooling member disposed adjacent to the feeding port 35. Each of the molding devices 30a, 30b can include a different number of heaters 73 or no heater 73. In some embodiments, the injection molding system includes the extruding system 10, the discharging channel 20, and a single molding device 30a, wherein the molding device 30a includes the heater 73 configured to adjust the temperature of the feeding port 35.

In some embodiments, the control system 60 further electrically controls the insulator 70, the heaters 72 of the discharging channels 20 and the heaters 73 of the molding devices 30a, 30b in real time. In some embodiments, the control system 60 controls the discharging channels 20 to be connected to one of the molding devices 30a, 30b, and controls the heaters 72 of the discharging channels 20 or the heater 73 of the corresponding one of the molding device 30a, 30b to heat the discharging channel 20, the outlet 21 or the feeding port 35 to a predetermined temperature.

In some embodiments, each of the molding devices 30a, 30b of an injection molding system 200 further includes a sealing element 39 configured to tightly dock the upper mold 32 to the lower mold 33. In some embodiments, the sealing element 39 is disposed below the lower mold 33 and provides a force toward the discharging channels 20. In some embodiments, a first force toward the corresponding one of molding device 30a, 30b is generated during the injecting of the mixture, and the sealing element 39 provides a second force against the first force. In some embodiments, the sealing element 39 is disposed between the upper mold 32 and the lower mold 33. The sealing element 39 may be disposed between the upper mold 32 and the lower mold 33, or between the upper mold base 34 and the upper mold 32. In some embodiments, the control system 60 controls the sealing element 39 in real time.

Figure 7:
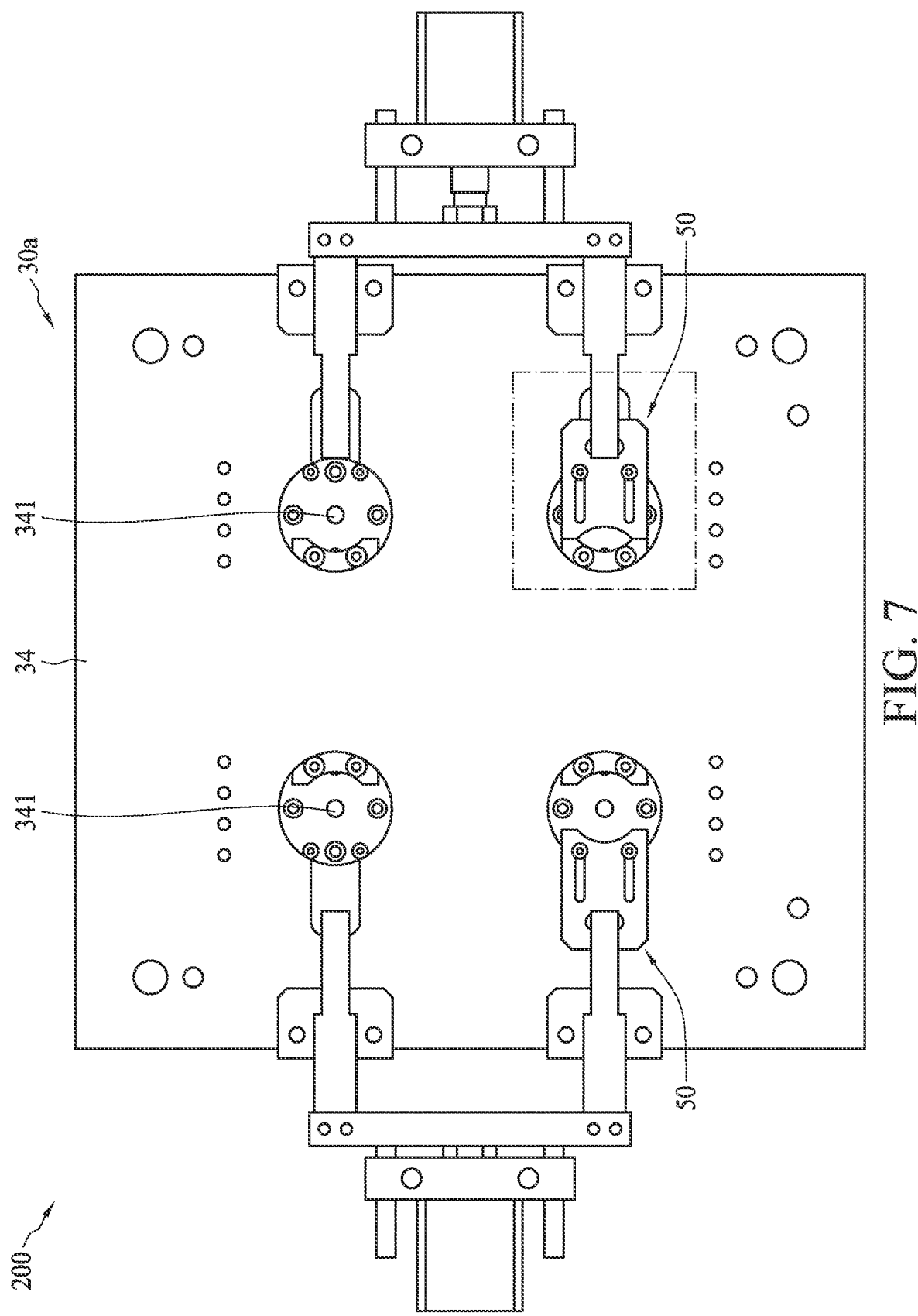
FIG. 7 is a schematic diagram of a portion of an injection molding system in FIG. 6 according to one embodiment of the present invention.
Figure 8:
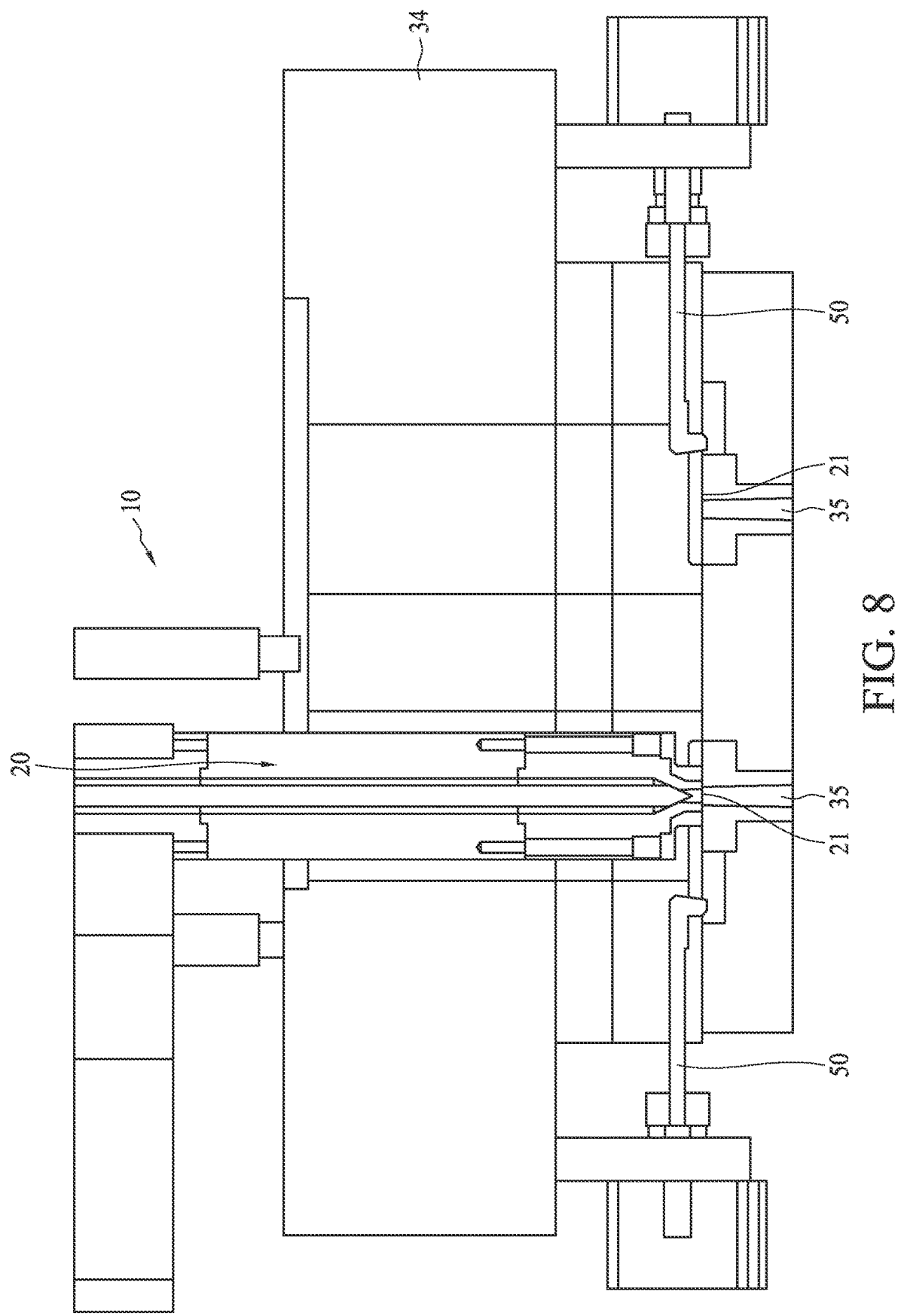
FIG. 8 is a schematic diagram of a portion of the injection molding system in FIG. 6 according to one embodiment of the present invention.

FIG. 7 is a top view of a portion of the injection molding system 200 according to one embodiment of the present invention. FIG. 8 is a schematic diagram of a portion of the injection molding system 200 according to one embodiment of the present invention. After injection of the mixture into the molding device 30a, the discharging channels 20 are disengaged from the feeding ports 35, at which point mixture in the molding device 30a may overflow out of the molding device 30a from the feeding port 35 and the opening 341. In some embodiments, referring to FIG. 6, FIG. 7 and FIG. 8, the injection molding system 200 further includes a cover 50 configured to prevent the overflow of the mixture, in some embodiments, the cover 50 is configured to stop the mixture from overflowing from the feeding port 35 of the upper mold 32. In some embodiments, the cover 50 is configured to cover the feeding port 35 of the upper mold 32. In some embodiments, the cover 50 is configured to stop the mixture from overflowing from the feeding port 35 of the upper mold 32 and the opening 341 of the upper mold base 34. In some embodiments, the cover 50 is configured to cover the feeding port 35 of the upper mold 32 and the opening 341 of the upper mold base 34. In some embodiments, the cover 50 is moved to cover the feeding port 35 immediately after the discharging channel 20 is withdrawn from the upper mold base 34.

In some embodiments, the cover 50 is attached to the molding device 30a. The cover 50 may be an individual element or module disposed between the molding devices 30 and the discharging channels 20. In some embodiments, the cover 50 is attached to the upper mold base 34. The number of covers 50 is not particularly limited. In some embodiments, the number corresponds to the number of the openings 341 of the upper mold base 34 or the number of feeding ports 35.

Figure 9:
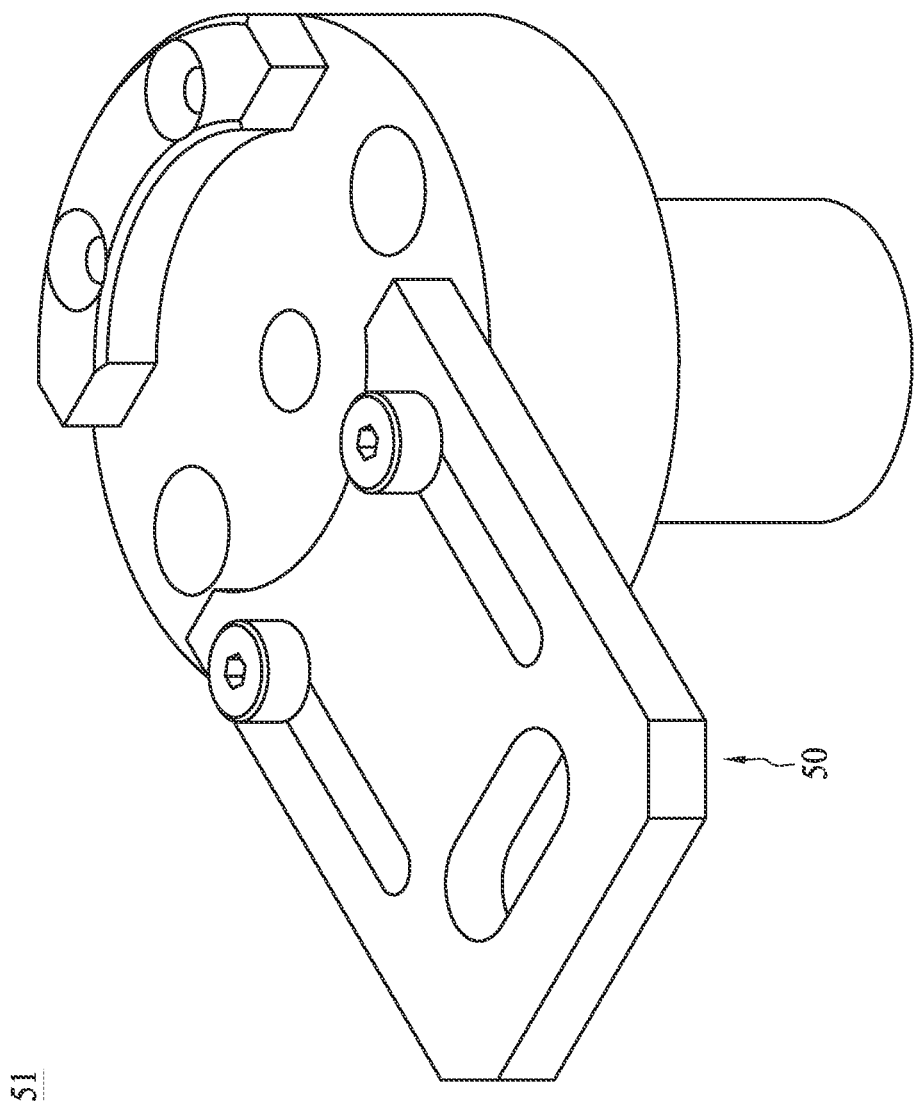
FIG. 9 is a schematic diagram of a portion of the injection molding system in FIG. 6 according to one embodiment of the present invention.
Figure 10:
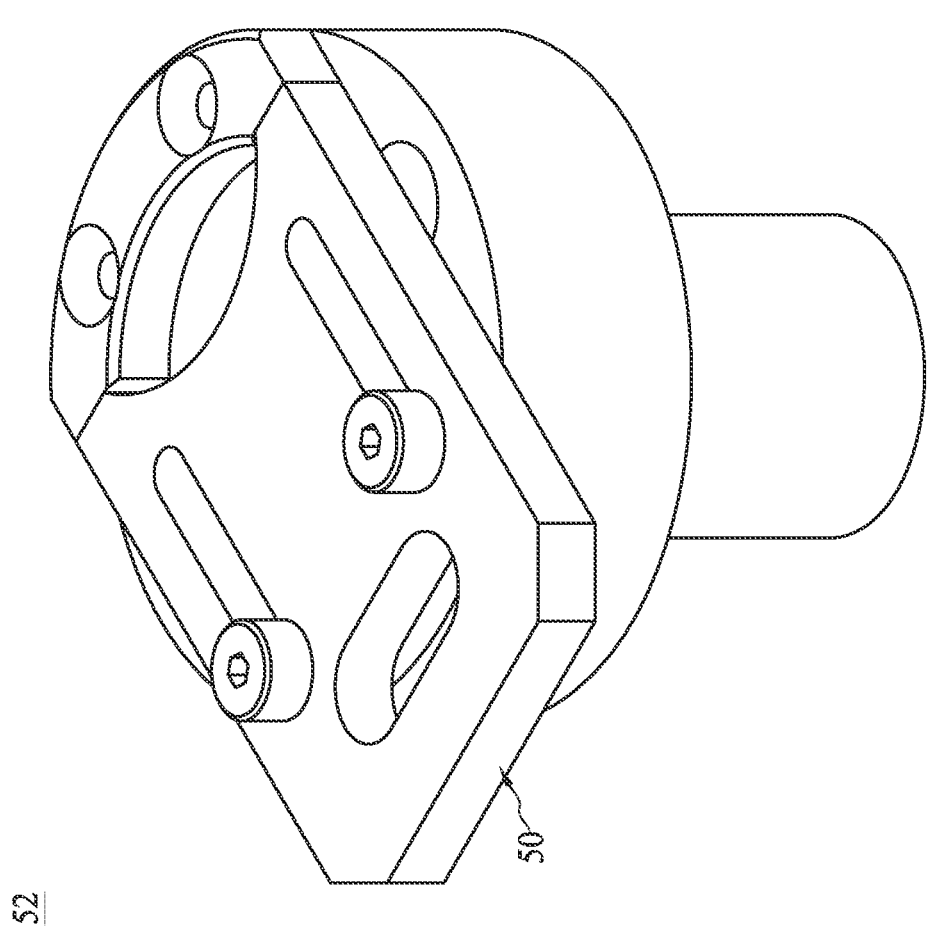
FIG. 10 is a schematic diagram of a portion of the injection molding system in FIG. 6 according to one embodiment of the present invention.

FIG. 9 and FIG. 10 are schematic diagrams of a portion of the injection molding system 200 according to one embodiment of the present invention. Referring to FIG. 9 and FIG. 10, the cover 50 is configured to move between a first position 51 and a second position 52, At the first position 51, the cover 50 is away from the opening 341 and the corresponding feeding port 35, and the corresponding discharging channel 20 can engage with the corresponding feeding port 35. At the second position 52, the cover 50 covers the corresponding opening 341 and the corresponding feeding port 35, and the corresponding discharging channel 20 cannot engage with the corresponding feeding port 35. In some embodiments, the cover 50 can be operated manually or automatically. In some embodiments, movement of the cover 50 can be controlled manually or automatically by the control system 60 in real time. In some embodiments, the cover 50 is moved from the first position 51 to the second position 52 to cover the feeding port 35 immediately after the discharging channel 20 is withdrawn from the upper mold base 34.

Figure 11:
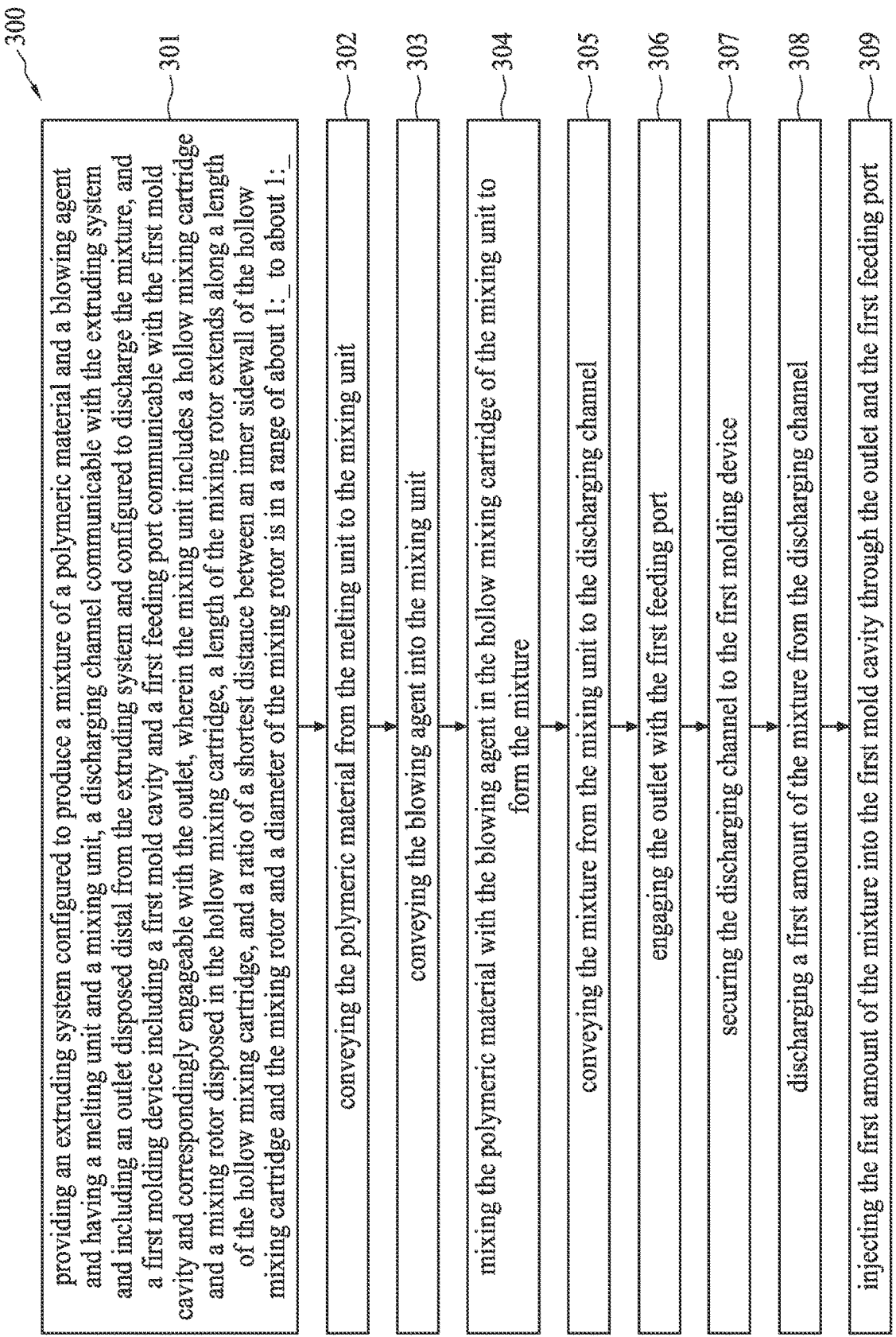
FIG. 11 is a flowchart illustrating a method of injection molding according to one embodiment of the present invention.

In the present disclosure, a method of injection molding is disclosed. In some embodiments, an injection molding is performed by the method. The method includes a number of operations and the description and illustrations are not deemed as a limitation of the sequence of the operations. FIG. 11 is a flowchart illustrating a method of injection molding according to one embodiment of the present invention. In some embodiments, as shown in FIG. 11, the injection molding method 300 includes the following steps.

Step 301 includes providing an extruding system configured to produce a mixture of a polymeric material and a blowing agent and having a melting unit and a mixing unit, a discharging channel communicable with the extruding system and including an outlet disposed distal to the extruding system and configured to discharge the mixture, and a first molding device including a first mold cavity and a first feeding port communicable with the first mold cavity and correspondingly engageable with the outlet, wherein the mixing unit includes a hollow mixing cartridge and a mixing rotor disposed in the hollow mixing cartridge, a length of the mixing rotor extends along a length of the hollow mixing cartridge, and a ratio of a shortest distance between an inner sidewall of the hollow mixing cartridge and the mixing rotor to a diameter of the mixing rotor is in a range of about 1:1500 to about 1:4500.

Step 302 includes conveying the polymeric material from the melting unit to the mixing unit.

Step 303 includes conveying the blowing agent into the mixing unit.

Step 304 includes mixing the polymeric material with the blowing agent in the hollow mixing cartridge of the mixing unit to form the mixture.

Step 305 includes conveying the mixture from the mixing unit to the discharging channel.

Step 306 includes engaging the outlet with the first feeding port.

Step 307 includes securing the discharging channel to the first molding device.

Step 308 includes discharging a first amount of the mixture from the discharging channel.

Step 309 includes injecting the first amount of the mixture into the first mold cavity through the outlet and the first feeding port.

The method 300 is not limited to the above-mentioned embodiments. In some embodiments, the method of injection molding 300 uses any of the above-mentioned injection molding systems 100 and 200 as shown in FIG. 1 to FIG. 10.

In some embodiments, the method of injection molding 300 includes step 301, which includes providing an extruding system 10 configured to produce a mixture of a polymer and a blowing agent, a discharging channel 20 communicable with the extruding system 10 and including an outlet 21 distal to the extruding system 10 and configured to discharge the mixture, a first molding device 30a and a second molding device 30b disposed adjacent to the first molding device 30a, The first molding device 30a includes a first mold cavity 31 and a first feeding port 35 communicable with the first mold cavity 31 and correspondingly engageable with the outlet 21. The mixing unit 130 includes a hollow mixing cartridge 131 and a mixing rotor 134 disposed in the hollow mixing cartridge 131, a length of the mixing rotor 134 extends along a length of the hollow mixing cartridge 131, and a ratio of a shortest distance between an inner sidewall of the hollow mixing cartridge 131 and the mixing rotor 134 to a diameter of the mixing rotor 134 is in a range of about 1:1500 to about 1:4500.

In some embodiments, step 301 further includes providing an injection unit 150 communicable with the mixing unit 120. In some embodiments, the provision of the injection unit 150 includes providing a discharging member 153 and a hollow metering cartridge 151 configured to receive the mixture from the mixing unit 120, and disposing the discharging member 153 in the metering cartridge 151. When the discharging member 153 is disposed in the metering cartridge 151, a shortest distance between an inner sidewall of the metering cartridge 151 and the discharging member 153 is less than 0.005 mm.

In some embodiments, the disposing of the discharging member 153 into the metering cartridge 151 includes heating the metering cartridge 151 to thermally expand the metering cartridge 151, and then installing the discharging member 153 into the metering cartridge 151. In some embodiments, the metering cartridge 151 is heated to a first temperature of about 170° C. to about 190° C. In some embodiments, after the installation of discharging member 153 into the metering cartridge 151, the metering cartridge 151 is cooled down to a second temperature substantially lower than the first temperature. In some embodiments, the second temperature is in a range of about 50° C. to about 100° C. In some embodiments, the metering cartridge 151 is cooled down to a room temperature. After the cooling of the metering cartridge 151, the metering cartridge 151 is shrunken such that the discharging member 153 is held inside the metering cartridge 151 and maintains a desirably small distance between the discharging member 153 and the metering cartridge 151.

In some embodiments, the method 300 includes step 302, which includes conveying the polymeric material from the melting unit 120 to the mixing unit 130. Step 301 further includes controlling flow of the polymeric material from the melting unit 120 to the mixing unit 130 by a first flow control element 161 disposed between the melting unit 120 and the mixing unit 130.

In some embodiments, as shown in FIG. 2, the polymeric material is conveyed through a feeding hopper 125 into an inner space 1211 of a pressing cartridge 121 of the melting unit 120. In some embodiments, the polymeric material is conveyed from a first feeding passage 122 to a first discharging passage 123 of the melting unit 120 by rotation of a pushing member 124 disposed in the inner space 211 of the pressing cartridge 121. In some embodiments, the pushing member 124 is immovable in a direction parallel to the longitudinal axis of the pressing cartridge 121.

In some embodiments, the polymeric material is conveyed from a first feeding passage 122 of the melting unit 120 to a second feeding passage 132 of the mixing unit 130 by rotation of a pushing member 124 disposed in the inner space 1211 of the pressing cartridge 121. In some embodiments, the second feeding passage 132 is disposed at one end of a hollow mixing cartridge 131.

In some embodiments, a sensor 182 of a monitoring module 180 senses that a first pressure inside the melting unit 120 is greater than a second pressure inside the mixing unit 130. In some embodiments, the sensor 182 continuously senses the pressure in the melting unit 120 and the pressure in the mixing unit 430, and transmits a signal or data based on the processing condition detected to a central processor 181 for further analysis.

In some embodiments, a pressure difference between the melting unit 120 and the mixing unit 130 is generated. In some embodiments, the first flow control element 161 maintains the pressure difference. In some embodiments, the first flow control element 161 is in an open configuration while the polymeric material is conveyed from the melting unit 120 to the mixing unit 130. In some embodiments, the first flow control element 161 is in a closed configuration when the first pressure is similar to the second pressure.

In some embodiments, the polymeric material is conveyed from the melting unit 120 to the mixing unit 130 through a first port 171 located between and connecting the melting unit 120 and the mixing unit 130. In some embodiments, the first flow control element 161 is disposed at the first port 171. In some embodiments, the polymeric material is conveyed and/or drawn from the melting unit 120 to the mixing unit 130 through the first port 171 by a pressure difference between the first pressure and the second pressure.

In some embodiments, the method 300 includes step 303, which includes conveying the blowing agent into the mixing unit 130. In some embodiments, the blowing agent is conveyed through a blowing agent supply unit 140 into the mixing unit 130, In some embodiments, a flow rate of the blowing agent from the blowing agent supply unit 140 is controlled by the central processor 181.

In some embodiments, the method 300 includes step 304, which includes mixing the polymeric material with the blowing agent in the hollow mixing cartridge 131 of the mixing unit 130 to form the mixture. In some embodiments, the polymeric material and the blowing agent are mixed by rotation of a mixing rotor 134 disposed in the mixing cartridge 131. In some embodiments, the mixing rotor 134 is immovable in a direction parallel to the longitudinal axis of the mixing cartridge 131.

In some embodiments, the polymeric material conveys from the melting unit 120 to the mixing unit 130 at a first flow rate, the blowing agent conveys into the mixing unit 130 at a second flow rate, and the ratio of the first flow rate to the second flow rate is fixed. In some embodiments, the polymeric material conveys into the mixing unit 130 for a first duration. In some embodiments, the flow rate of the polymeric material from the melting unit 120 is controlled by the central processor 181. In some embodiments, the blowing agent conveys into the mixing unit 130 for a second duration. In some embodiments, the second duration is substantially equal to the first duration. In some embodiments, the blowing agent and the polymeric material are conveyed into the mixing unit 130 simultaneously.

In some embodiments, the flow of the polymeric material has a stable flow rate. In some embodiments, the flow of the blowing agent has a stable flow rate. In some embodiments, the flow rate of the polymeric material and the flow rate of the blowing agent are controlled so that the ratio of the blowing agent to the polymeric material is substantially constant.

For example, a target ratio of the blowing agent to the mixture is 5 vol %. The central processor 181 can control flow rates of the blowing agent and the polymeric material to maintain the ratio of the blowing agent to the mixture as 5 vol %. For instance, the blowing agent is automatically controlled to be provided with flow rate of 5 g/second and the polymeric material is automatically controlled to be provided with flow rate of 95 g/second so that the ratio of the blowing agent to the mixture of the polymeric material and the blowing agent is maintained as 5 vol %. Accordingly, although the injection unit 150 provides the mixture with same or different amounts in different mold cavities 31 of the molding devices 30a 30b, the ratios of the blowing agent to the mixture of the same or different amounts are the same as 5 vol %.

In some embodiments, mixing the polymeric material with the blowing agent and conveying the mixture of the polymeric material and the blowing agent from the second feeding passage 132 to a second discharging passage 133 is conducted by rotation of the mixing rotor 134. The second feeding passage 132 and the second discharging passage 133 are respectively disposed at two opposite ends of the mixing cartridge 131 of the mixing unit 130. In some embodiments, the mixture accumulates in the mixing cartridge 131 of the mixing unit 130.

In some embodiments, when the polymeric material is mixed with the blowing agent by the mixing rotor 134, the blowing agent may be highly contained in the spaces between the mixing rotor 134 and the hollow mixing cartridge 131 because the ratio of the shortest distance between an inner sidewall of the hollow mixing cartridge 131 and the mixing rotor 134 and the diameter of the mixing rotor 134 is in a range of about 1:_ to about 1:_. In other words, the blowing agent in the spaces between the mixing rotor 134 and the hollow mixing cartridge 131 may not be leaked easily because the shortest distance between the inner surface of the hollow mixing cartridge 131 and the mixing rotor 134 is small enough. Accordingly, the mixture prepared by the extruding system 10 may include an optimal amount of the blowing agent conveyed into the mixing unit 130.

In some embodiments, regarding the processes in the melting unit 120, because the pushing member 124 utilizes screws to convey the polymeric material and the pushing member 124 is immovable in the direction parallel to the longitudinal axis of the pressing cartridge 121, the flow rate of the polymeric material from the melting unit 120 to the mixing unit 130 can be stable. Regarding the processes in the mixing unit 130, because: (1) the mixing rotor 134 utilizes screws to mix the blow agent with the polymeric material, which is provided with the stable flow rate, from the melting unit 120 and (2) the blowing agent in the spaces between the mixing rotor 134 and the hollow mixing cartridge 131 may not be leaked easily, the density of the mixture may be low and stable. Further, because the mixing rotor 134 utilizes screws to convey the mixture, and the mixing rotor 134 is immovable in a direction parallel to the longitudinal axis of the mixing cartridge 131, the flow rate of the mixture from the mixing unit 130 to the injection unit 150 can be stable.

In some embodiments, the sensor 182 senses the processing conditions of the mixing, such as the second pressure inside the mixing unit 130, the temperature of the mixing unit 130, rotational speed of the mixing rotor 134, and rate and amount of the blowing agent flowing through the blowing agent supply unit 140, and the sensor 182 transmits a signal or data based on the processing condition detected to the central processor 181 for further analysis.

In some embodiments, the method 300 includes step 305, which includes conveying the mixture from the mixing unit 130 to the discharging channel 20. In some embodiments, the step 305 further includes conveying the mixture from the mixing unit 130 to the injection unit 150, and conveying the mixture from the injection unit 150 to the discharging channel 20. In some embodiments, the mixture is conveyed from the mixing unit 130 to the injection unit 150 and accumulates in the inner space 1511 of the metering cartridge 151 of the injection unit 150. In some embodiments, the mixture is conveyed from the injection unit 150 to the discharging channel 20 and accumulates in the discharging channel 20.

In some embodiments, regarding the processes in the injection unit 150, because the flow rate of providing the polymeric material from the melting unit 120 to the mixing unit 130 is stable and the mixing unit 130 provides the mixture stably, the discharging member 153 may just be movable in the direction parallel to the longitudinal axis of the metering cartridge 151 to inject the mixture with precise amount. Accordingly, although the injection unit 150 may provide the mixture with same or different amounts in different mold cavities of the molding devices 30*a*, 30*b*, the ratios of the blowing agent to the mixture of the same or different amounts are the same since: (1) the flow rates of the polymeric material, the blowing agent and the mixture; and (2) the density of the mixture are all stable. The mixture of the blowing agent and the polymeric material provided by the mixing cartridge 131 and the mixing rotor 134 is more uniform and even.

In some embodiments, the step 305 further includes controlling flow of the mixture from the mixing unit 130 to the injection unit 150 by a second flow control element 162 disposed between the mixing unit 130 and the injection unit 150.

In some embodiments, as shown in FIG. 2, the mixture is conveyed from the second discharging passage 133 into an inner space 1511 of a hollow metering cartridge 151 of the injection unit 150. In some embodiments, the polymeric material is conveyed from the second discharging passage 133 of the mixing unit 130 to an inner space 1511 of the metering cartridge 151 of the injection unit 150 through a connecting passage 152 by rotation of the mixing rotor 134 disposed in the mixing cartridge 131. In some embodiments, the connecting passage 152 is disposed at one end of the metering cartridge 151.

In some embodiments, the sensor 182 of the monitoring module 180 senses that the second pressure inside the mixing unit 130 is greater than a third pressure inside the injection unit 150. In some embodiments, the sensor 182 continuously senses the pressures in the mixing unit 130 and the injection unit 150, and transmits a signal or data based on the processing condition detected to a central processor 181 for further analysis.

In some embodiments, a pressure difference between the mixing unit 130 and the injection unit 150 is generated. In some embodiments, the second flow control element 162 maintains the pressure difference. In some embodiments, the second flow control element 162 is in an open configuration while the mixture is conveyed from the mixing unit 130 to the injection unit 150. In some embodiments, the second flow control element 162 is in a closed configuration when the second pressure is similar to the third pressure.

In some embodiments, the mixture is conveyed from the mixing unit 130 to the injection unit 150 through a second port 172 located between and connecting the mixing unit 130 and the injection unit 150. In some embodiments, the second flow control element 162 is disposed at the second port 172. In some embodiments, the mixture is conveyed and/or drawn from the mixing unit 130 to the injection unit 150 through the second port 172 by a pressure difference between the second pressure and the third pressure.

In some embodiments, the method 300 includes step 306, which includes engaging the outlet 21 with the first feeding port 35 of the first molding device 30*a*.

Figure 12:
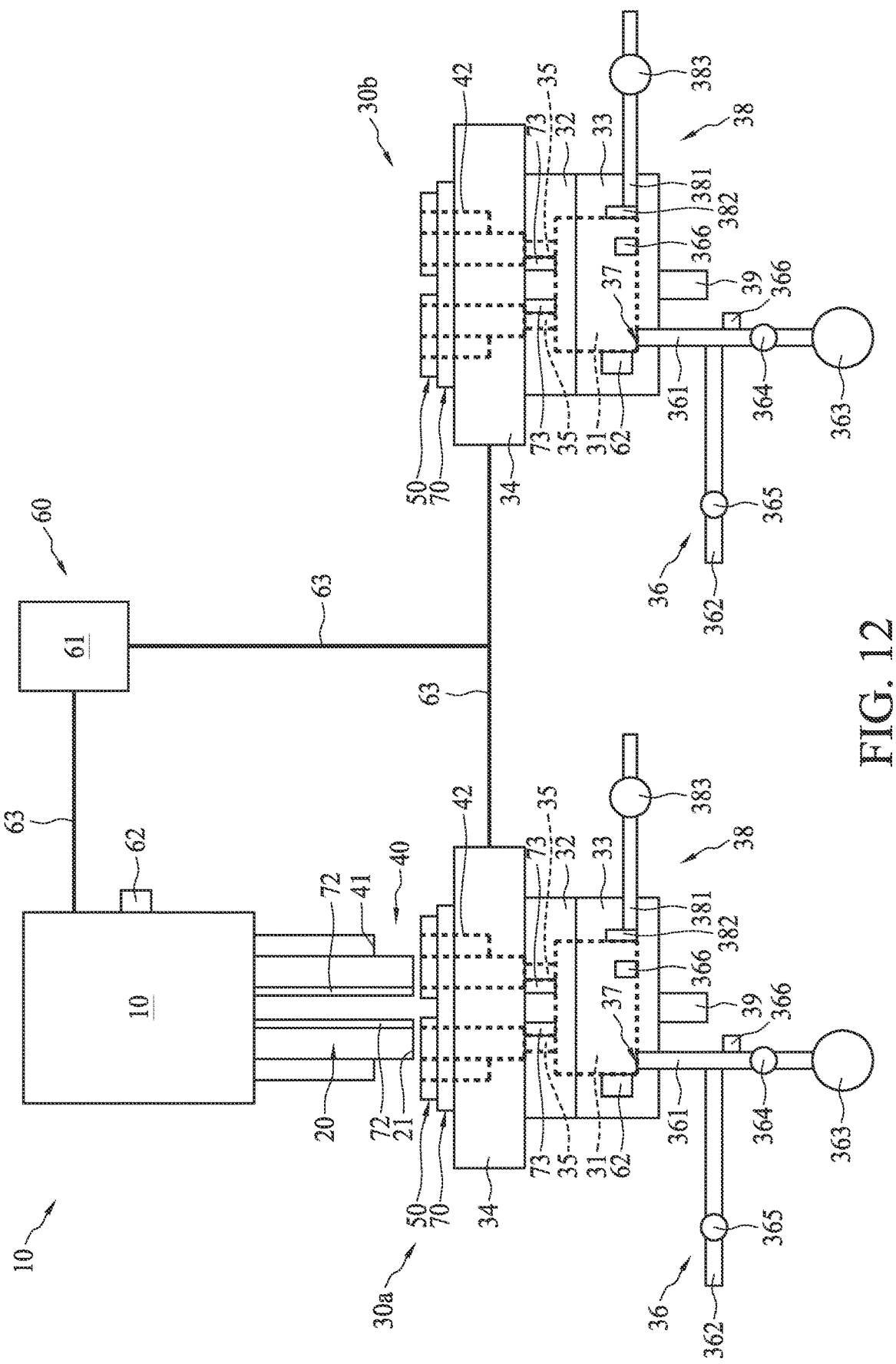
FIG. 12 to FIG. 20 are schematic diagrams illustrating exemplary operations for method of injection molding according to one embodiment of the present disclosure.

In some embodiments, referring to FIG. 12, at the beginning of steps 301 to 305, the extruding system 10 and the discharging channels 20 are away from the molding devices 30*a*, 30*b*.

Referring to FIG. 12, before the engagement of the outlet 21 with the first feeding port 35 of the first molding device 30*a*, the discharging channels 20 are moved to a first position above the first molding device 30*a*. In some embodiments, the discharging channels 20 are moved horizontally to the first position above the first molding device 30*a*. At the first position, the discharging channels 20 are aligned with the corresponding openings 341 of the upper mold base 34 of the first molding device 30*a*. In some embodiments, a distance between each outlet 21 and the upper surface of the upper mold base 34 is greater than 0.

Figure 13:
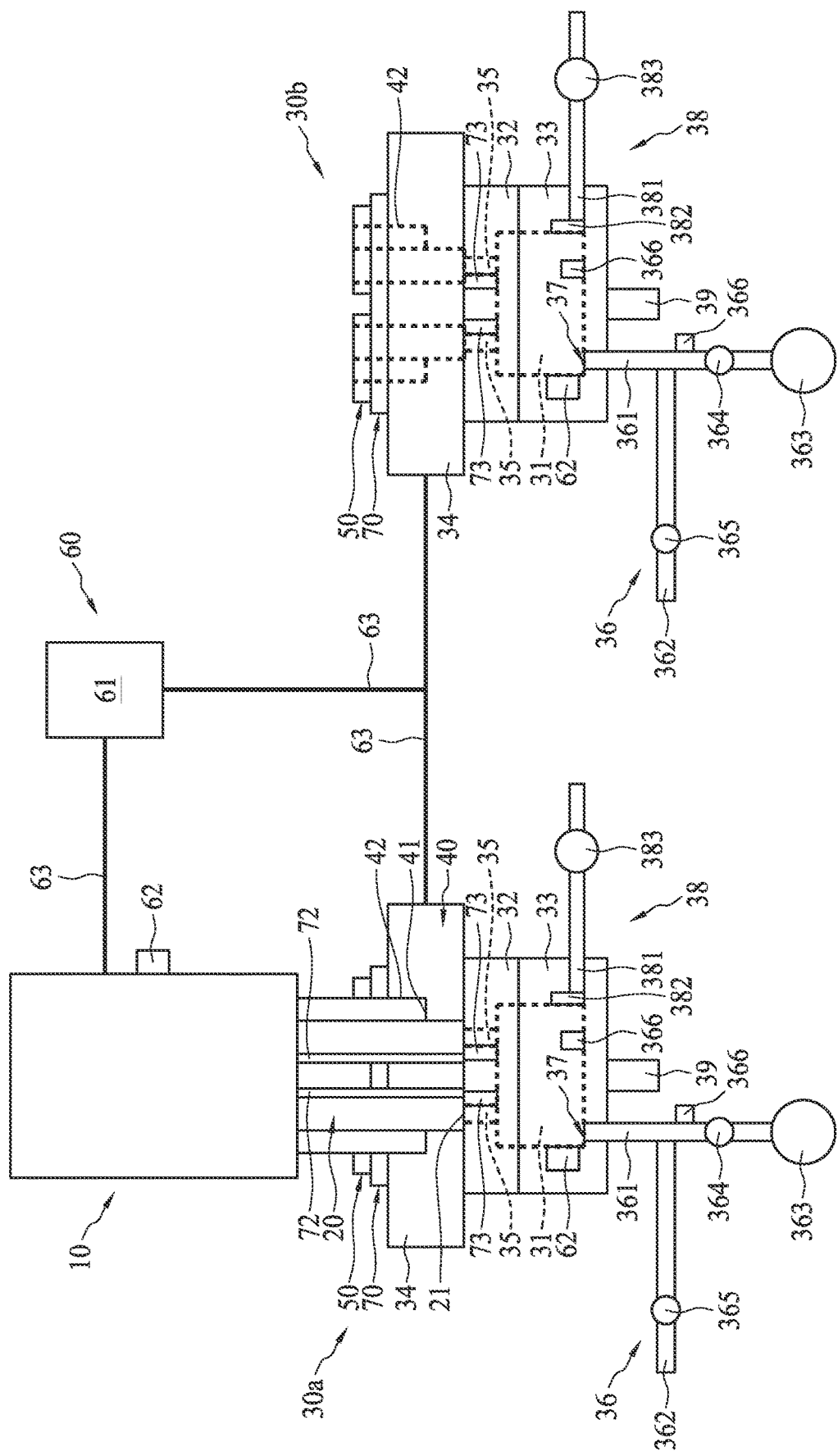

Referring to FIG. 13, after the vertical alignment of the discharging channels 20 with the corresponding openings 341, the discharging channels 20 are moved toward the first molding device 30*a* to be received by the corresponding openings 341 of the upper mold base 34, and then the outlets 21 are docked to the corresponding first feeding ports 35. In some embodiments, the discharging channels 20 are moved vertically toward the first molding device 30*a* to be received by the corresponding openings 341 of the upper mold base 34.

After the outlets 21 are docked to the first feeding ports 35, the outlets 21 and the corresponding first feeding ports 35 form flow paths of the mixture, such that the discharging channels 20 are communicable with the first mold cavity 31 through the first feeding ports 35. The outlets 21 must be tightly engaged with the corresponding first feeding port 35 in order to prevent the mixture from leaking out of the first molding device 30*a*.

In some embodiments, when the mixture is ready to be injected by the extruding system 10, the discharging channels 20 are aligned with the first molding device 30*a* and the cover 50 of the first molding device 30*a* is slid from the second position 52 to the first position 51. After the movement of the cover 50 from the second position 52 to the first position 51, the outlets 21 can engage with the corresponding first feeding ports 35.

In some embodiments, the method 300 includes step 307, which includes securing the discharging channel 20 to the first molding device 30*a*. In some embodiments, a force is provided by a support device 40 to prevent the separation of the extruding system 10 from the first molding device 30*a*. In some embodiments, in step 307, when the mixture is injected from the extruding system 10 into the molding device 30, the first molding device 30*a* may generate a reaction force opposite to an injection direction, and the reaction force may be transmitted to the discharging channels 20 and the extruding system 10, so that the discharging channels 20 tend to separate from the first molding device 30*a*. In some embodiments, the supporting device 40 provides support against the reaction force opposite to the injection direction.

In some embodiments, the discharging channels 20 is secured to the first molding device 30*a* by engaging a first element 41 of the supporting device 40 relative to a second element 42 of the supporting device 40 to secure the discharging channels 20 with the first molding device 30*a*, wherein the first element 41 protrudes from the extruding system 10, and the second element 42 is disposed on the first molding device 30*a*. In some embodiments, a force is provided by the supporting device 40 after the engagement to prevent the discharging channel 20 separating from the first molding device 30*a*.

In some embodiments, the discharging channel 20 is secured to the first molding device 30a by turning a supporting device 40 into the lock state, such as rotating a first element 41 of the supporting device 40 relative to and within a second element 42 of the supporting device 40 while engaging the outlet 21 with the first feeding port 35, In some embodiments, when the outlets 21 are docked to the first feeding ports 35, the first element 41 enters the second element 42 and then locked with the second element 42. In some embodiments, the discharging channel 20 is secured to the first molding device 30a by rotating an elongated portion 411 and an arm portion 412 of the first element 41 of the supporting device 40, the elongated portion 411 is fixed to the extruding system 10 and extends in a first direction Z toward the first molding device 30a, and the arm portion 412 is coupled to the elongated portion 411 and extends in a second direction X different from the first direction Z. In some embodiments, the upper mold 32 is sealed to the corresponding lower mold 33 by the sealing element 39.

Figure 14:
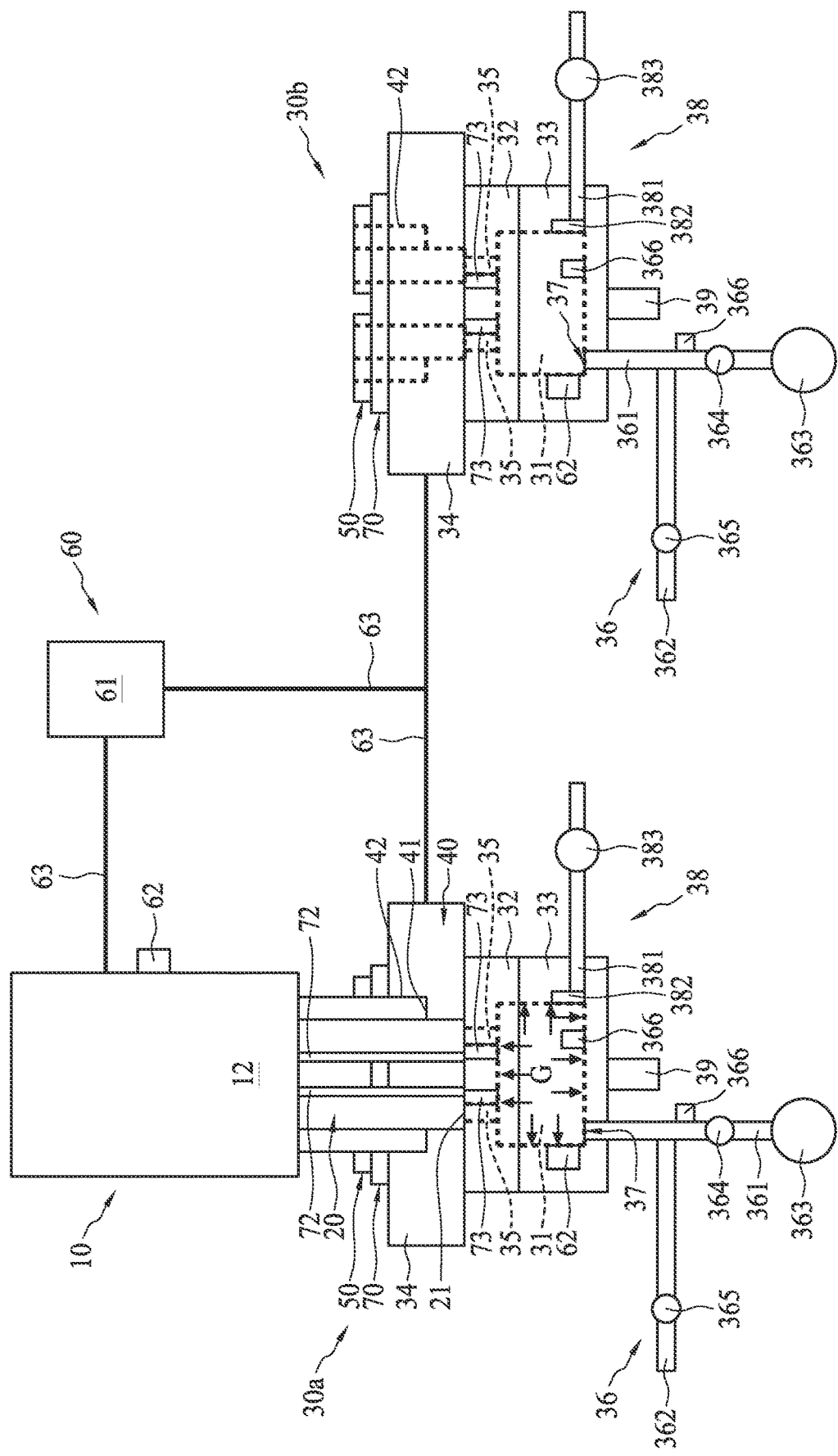

In some embodiments, referring to FIG. 14, the method further includes injecting a gas G into the first mold cavity 31 through a pressure-regulating system 36 in connection with the first mold cavity 31 until the first mold cavity 31 is sensed to have a first predetermined pressure before injecting the mixture into the first mold cavity 31. In some embodiments, the gas G injected into the first mold cavity 31 through a first gas conduit 361. In some embodiments, the gas G is any suitable gas depending on the need; for example, air; however, the present invention is not limited thereto. In some embodiments, after the engagement of the outlets 21 and the first feeding portion 35, the pressure in the first mold cavity 31 of the first molding device 30a is adjusted to the first predetermined pressure. After the first molding device 30a has the first predetermined pressure, the injection begins. The cover 50 remains at the first position 51 during the injection of the mixture.

In some embodiments, the pressure sensing unit 366 senses that the pressure in the first mold cavity 31 is the atmospheric pressure. In some embodiments, a first valve 364 is opened so that a gas G is injected into the first mold cavity 31 through the first gas conduit 361, In some embodiments, the gas G is injected into the first mold cavity 31 through the pressure-regulating system 36 when the first feeding port 35 is closed. In some embodiments, the gas G is injected into the first mold cavity 31 through the first feeding port 35.

In some embodiments, during the process of injecting the gas G into the first mold cavity 31, the pressure in the first mold cavity 31 is sensed continuously. In some embodiments, the pressure sensing unit 366 continuously senses the pressure in the mold cavity 31, and the gas G is injected into the mold cavity 31 until it is senses that the mold cavity 31 has the first predetermined pressure; then, the first valve 364 and the second valve 365 of the pressure-regulating system 36 and the valve 383 of the venting unit 38 are closed, and the gas G injection into the mold cavity 31 is stopped. In some embodiments, the first predetermined pressure is greater than the atmospheric pressure. In some embodiments, the first predetermined pressure is less than the atmospheric pressure. In some embodiments, a size of the first mold cavity 31 is 800 c.c., and the first predetermined pressure is 25 kg/cm3. In some embodiments, the first mold cavity 31 includes 20L of gas G.

In some embodiments, the first mold cavity 31 has the first predetermined pressure before step 308, and the first valve 364 and the second valve 365 of the pressure-regulating system 36 and the valve 383 of the venting unit 38 are closed.

In some embodiments, the heaters 72 heats the discharging channels 20 to keep the temperature of the discharging channels 20 within a predetermined range. In some embodiments, the heater 73 heats the first feeding port 35 to maintain the temperature of within the first feeding port 35 the predetermined range.

Figure 15:
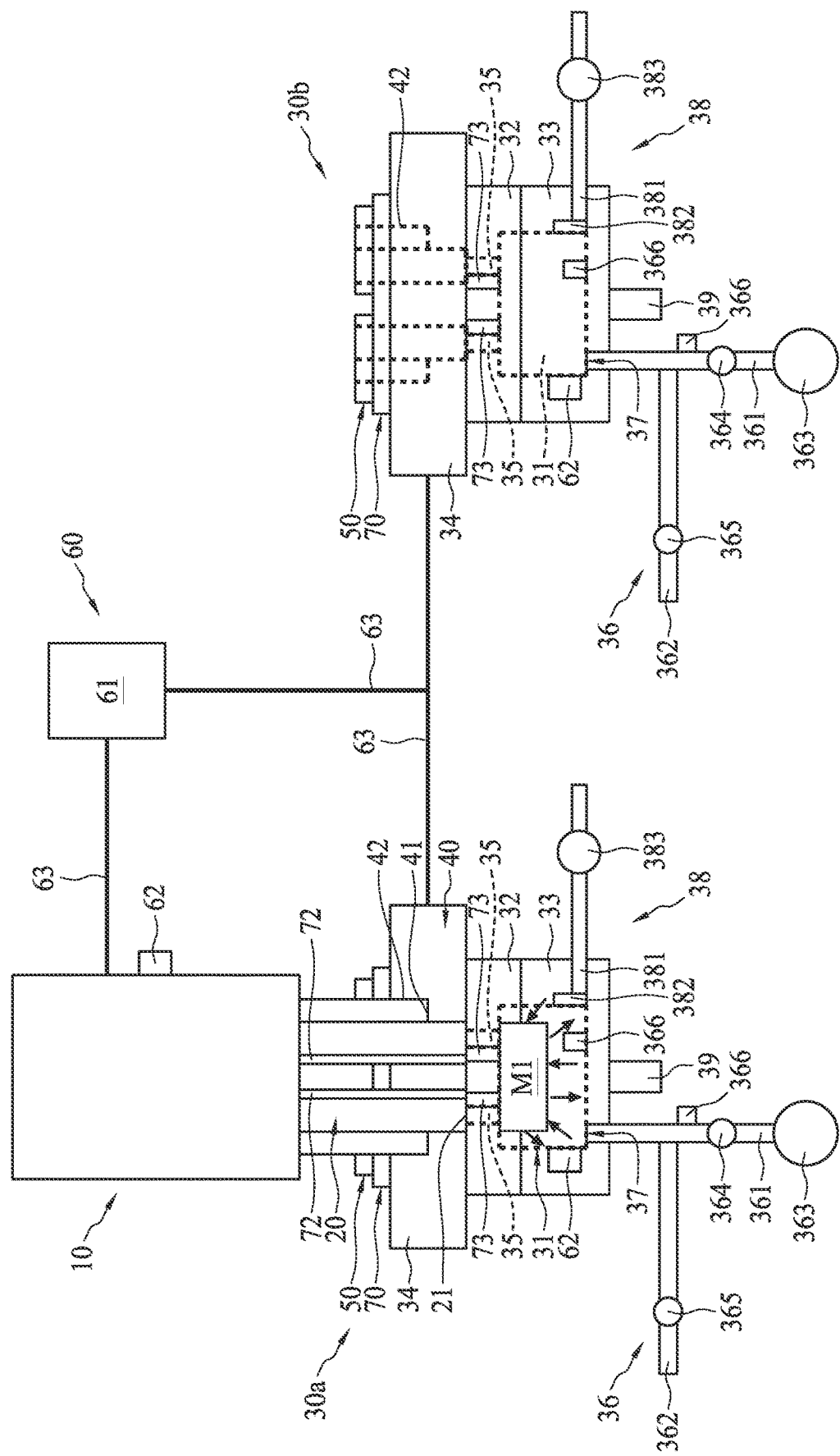

In some embodiments, the method 300 includes step 308, which includes discharging a first amount M1 of the mixture from the discharging channel 20. In some embodiments, the method 300 includes step 309, which includes injecting the first amount of the mixture M1 into the first mold cavity 31 through the outlet 21 and the first feeding port 35. Referring to FIG. 15, step 308 and step 309 includes injecting a first amount of the mixture M1 from the discharging channel 20 into the first mold cavity 31 through the outlet 21 and the first feeding port 35. In some embodiments, the discharging channel 20 is at least partially surrounded by the first molding device 30a upon the injection of the first amount of the mixture M1.

In some embodiments, in step 308, during the process of injecting the first amount of the mixture M1 into the first mold cavity 31 of the first molding device 30a, the pressure in the first mold cavity 31 changes rapidly, and the pressure-sensing unit 366 continuously senses the pressure in the first mold cavity 31. In some embodiments, the first amount of the mixture M1 is injected into the first mold cavity 31 of the first molding device 30a from the first feeding port 35, and the first predetermined pressure applies to the first amount of the mixture M1. In some embodiments, the first amount of the mixture M1 and the gas G are disposed in the first mold cavity 31, and the first amount of the mixture M1 will expand and foam in the mold cavity 31.

In some embodiments, the first amount of the mixture M1 is injected into the first mold cavity 31 of the first molding device 30a from the first feeding port 35, and thereby increasing the pressure in the first mold cavity 31. In some embodiments, the pressure in the mold cavity 31 of the first molding device 30a is raised above the first predetermined pressure. In some embodiments, the pressure in the first mold cavity 31 of the first molding device 30a is raised from the first predetermined pressure to a second predetermined pressure.

In some embodiments, after the first amount of the mixture M1 is injected into the first mold cavity 31 having the first predetermined pressure, the pressure in the mold cavity 31 increases, and therefore, the setting of a second predetermined pressure ensures that the first mold cavity 31 is maintained within a suitable pressure range. In some embodiments, when the first mold cavity 31 reaches the second predetermined pressure, the injection of the first amount of the mixture M1 into the first mold cavity 31 is stopped.

In some embodiments, the process of injecting the first amount of the mixture M1 into the first mold cavity 31 having the first predetermined pressure lasts for less than 1 second. In some embodiments, due to the mold cavity 31 has the first predetermined pressure, the completion of the filling the first amount of the mixture M1 may be last for less than 0.5 second. During the injecting period or at the moment of the completion of the injection, the pressure in the first mold cavity 31 is sensed by the pressure-sensing unit 366 in real time, and the pressure information is provided, so that the pressure-regulating system 36 can adjust the pressure in the first mold cavity 31 in accordance with the pressure information, and hence, the pressure in the first mold cavity 31 can be kept within the predetermined pressure range.

In some embodiments, in step 309, the cover 50 of the first molding device 30a is disposed at the first position 51 (as illustrated in FIG. 9) during the process of injection.

In some embodiments, during the process of injection, the temperature of the discharging channel 20 is greater than that of the first molding device 30a. In some embodiments, the temperature difference is maintained using the insulator 70 and the heaters 72, 73.

In some embodiments, step 309 further includes discharging a portion of the gas G from the first mold cavity 31 after injecting the gas G into the first mold cavity 31. In some embodiments, step 309 further includes foaming the first amount of the mixture M1 in the first mold cavity 31, and discharging the gas G in less than 1 second from the first mold cavity 31 through the pressure-regulating system 36 or a venting unit 38 while the first amount of the mixture M1 is foaming in the first mold cavity 31. Due to the discharging of the gas G, the first amount of the mixture M1 in the first mold cavity 31 after the foaming process may have a lower density. In some embodiments, the gas G is discharged from the first mold cavity 31 through the junction point 37 or a gas conduit 381 of the venting unit 38. In some embodiments, the gas G is discharged from the first mold cavity 31 during or after the foaming process of the first amount of the mixture M1 in the first mold cavity 31. In some embodiments, the pressure in the first mold cavity 31 is decreased from the second predetermined pressure.

For example, a size of the first mold cavity 31 is 800 c.c., the first predetermined pressure is 25 kg/cm$^3$ (the first mold cavity 31 includes 20L of the gas G), and the gas G is discharged from the first mold cavity 31 in 0.3 to 0.6 second, the rate of discharging gas G is 33 to 66 L/sec.

In some embodiments, when the pressure-sensing unit 366 senses that the pressure in the first mold cavity 31 is greater than the second predetermined pressure, a portion of the gas in the first mold cavity 31 is discharged until the pressure in the first mold cavity 31 is within a predetermined pressure range. In some embodiments, the predetermined pressure range is between the first predetermined pressure and the second predetermined pressure. In some embodiments, the second valve 365 is open and a portion of the gas G in the first mold cavity 31 is discharged through the second gas conduit 362. In some embodiments, the valve 383 is open and a portion of the gas in the first mold cavity 31 is passed through the shutter 382 and discharged through the gas conduit 381 of the venting unit 38.

Figure 16:
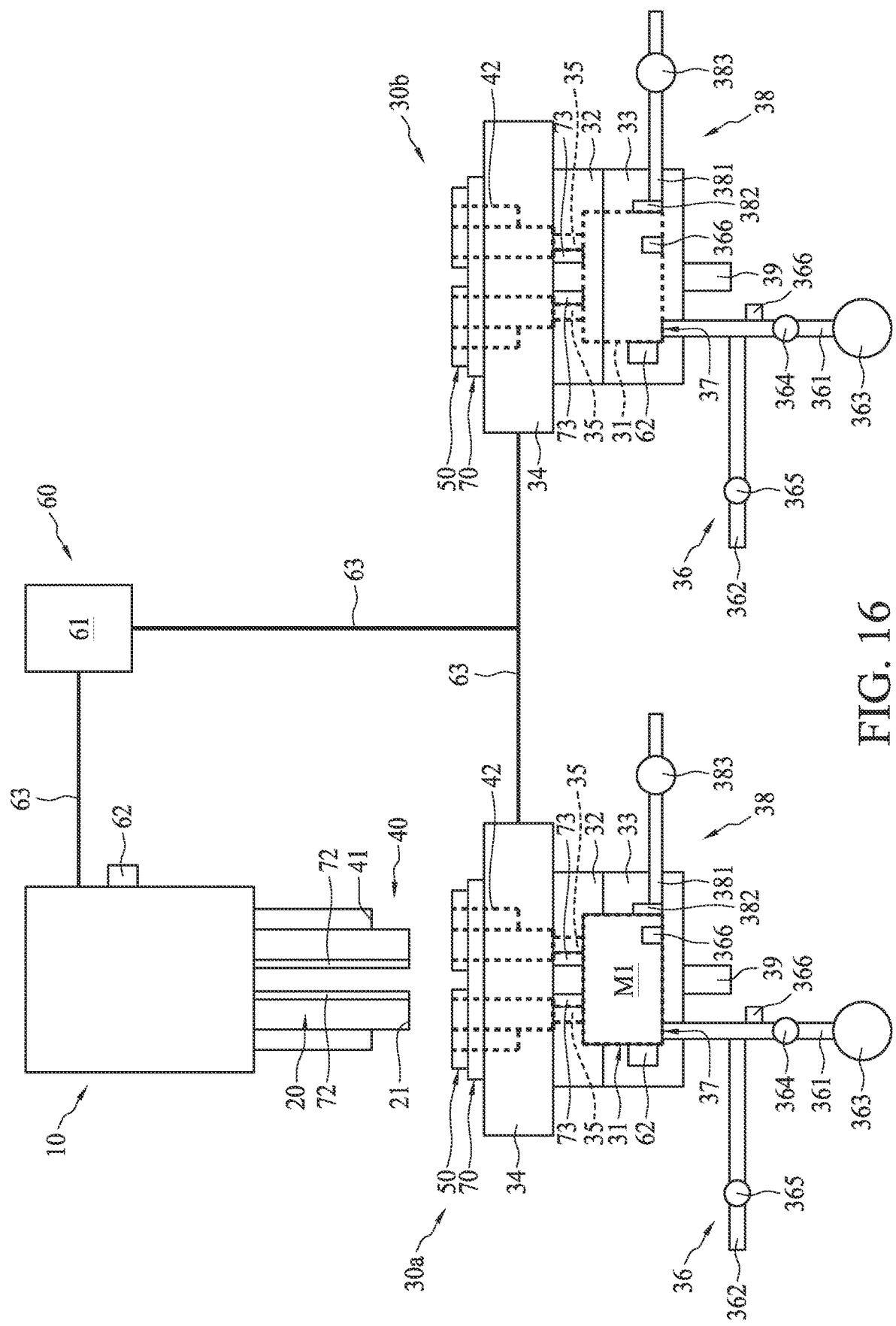

In some embodiments, the method 300 further includes disengaging the outlet 21 from the first feeding port 35 of the first molding device 30a. In some embodiments, referring to FIG. 16, after the injection of the first amount of the mixture M1 into the first mold cavity 31, the discharging channels 20 are disengaged from and moved away from the first molding device 30a.

In some embodiments, before the disengaging of the outlet 21 from the first feeding port 35, the supporting device 40 is shifted into the unlocked state. In some embodiments, the supporting device 40 is changed from locked state to unlocked state by rotating a first element 41 of the supporting device 40 relative to and within a second element 42 of the supporting device 40 to unlock the discharging channel 20 from the first molding device 30a. In some embodiments, during the disengagement of the outlet 21 from the first feeding port 35, the first element 41 is unlocked from the second element 42 and is then pulled away from the second element 42.

In some embodiments, the method 300 further includes covering the first feeding port 35 upon or after the disengagement of the outlet 21 from the first feeding port 35. When the outlet 21 is separated from the first feeding port 35, the cover 50 immediately slides from the first position 51 to the second position 52, so that the mixture in the first molding device 30a does not overflow from the first feeding port 35.

In some embodiments, the heater 73 of the first molding device 30a stops heating the first feeding port 35 after the disengagement of the outlet 21 from the first feeding port 35. In some embodiments, the heater 72 keeps heating the discharging channels 20.

In some embodiments, the method 300 further includes providing a second molding device 30b including a second mold cavity 31 and a second feeding port 35 communicable with the second mold cavity 31 and correspondingly engageable with the outlet 21. In some embodiments, the first molding device 30a and the second molding device 30b are arranged in a line, a row, a column, an arc, a curve or any other suitable arrangements.

Figure 17:
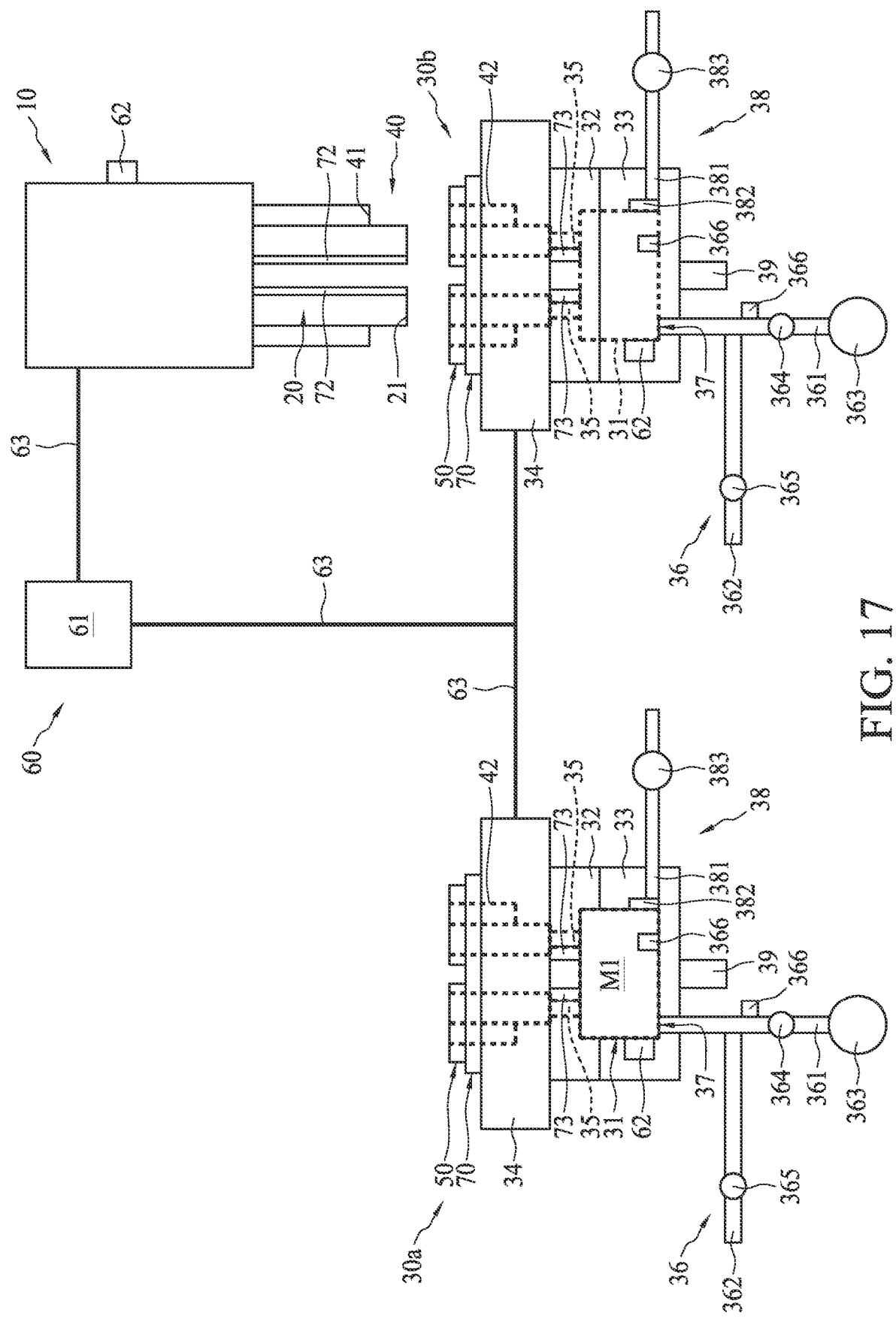

In some embodiments, the method 300 further includes moving the discharging channels 20 away from the first molding device 30a and toward the second molding device 30b. In some embodiments, referring to FIG. 17, the movement of the discharging channels 20 includes moving the discharging channels 20 from the first position above the first molding device 30a to a second position above the second molding device 30b. In some embodiments, the discharging channels 20 are moved vertically away from the first molding device 30a, and then moved horizontally to the second position above the second molding device 30b.

In some embodiments, the setting of the second molding device 30b is similar to the setting of the first molding device 30a in Step 301, and a detailed description thereof is omitted here for the sake of brevity.

Figure 18:
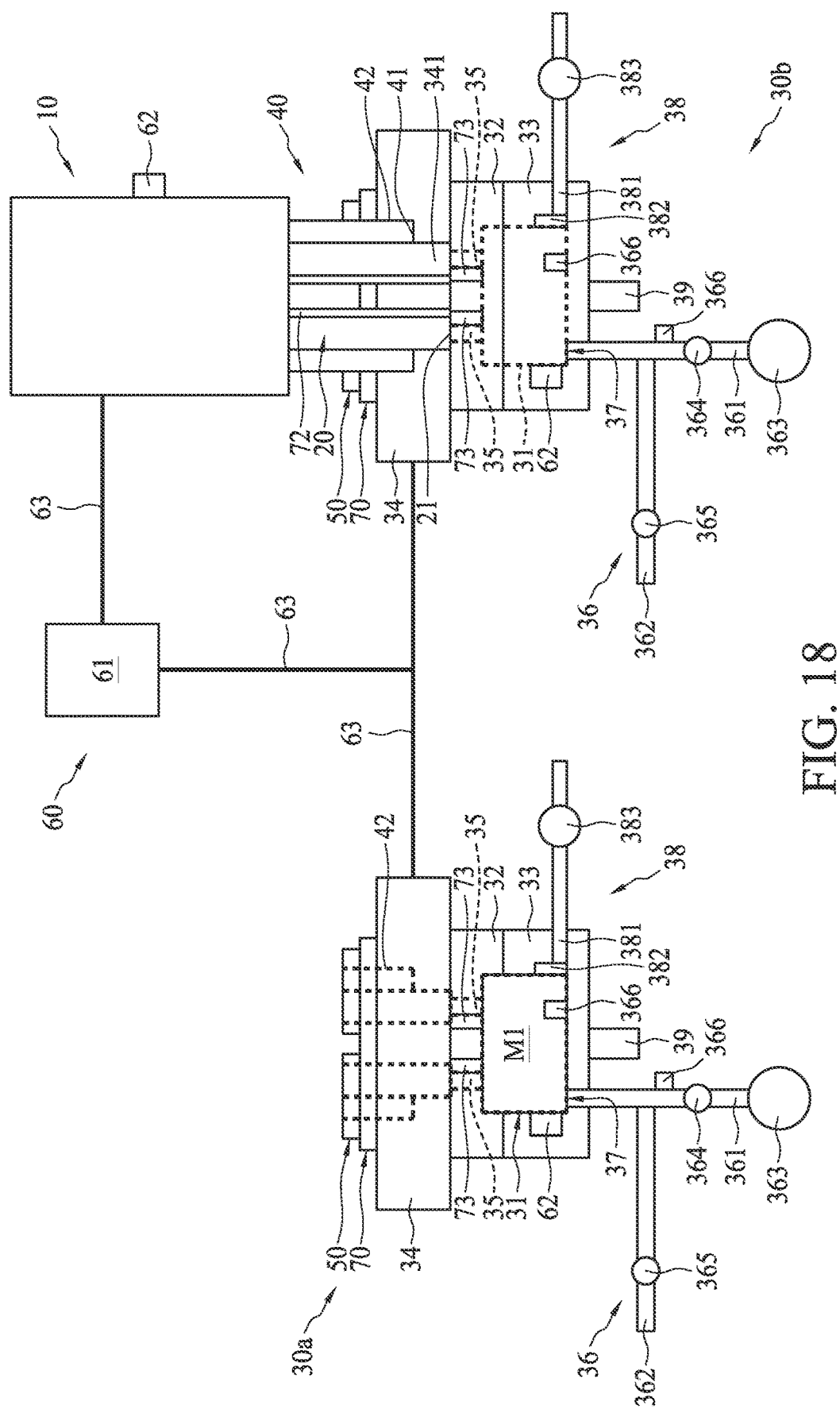

In some embodiments, the method 300 further includes engaging the outlet 21 with the second feeding port 35 of the second molding device 30b. In some embodiments, referring to FIG. 18, the discharging channels 20 are moved toward the second molding device 30b to be received by the corresponding openings 341 of the upper mold base 34 of the second molding device 30b, and then the outlets 21 are docked to the corresponding second feeding ports 35. In some embodiments, the method 300 further includes securing the discharging channel 20 to the second molding device 30b. In some embodiments, the process of securing the discharging channel 20 to the second molding device 30b is similar to the process of the first molding device 30a in step 307, and a detailed description thereof is omitted here for the sake of brevity.

Figure 19:
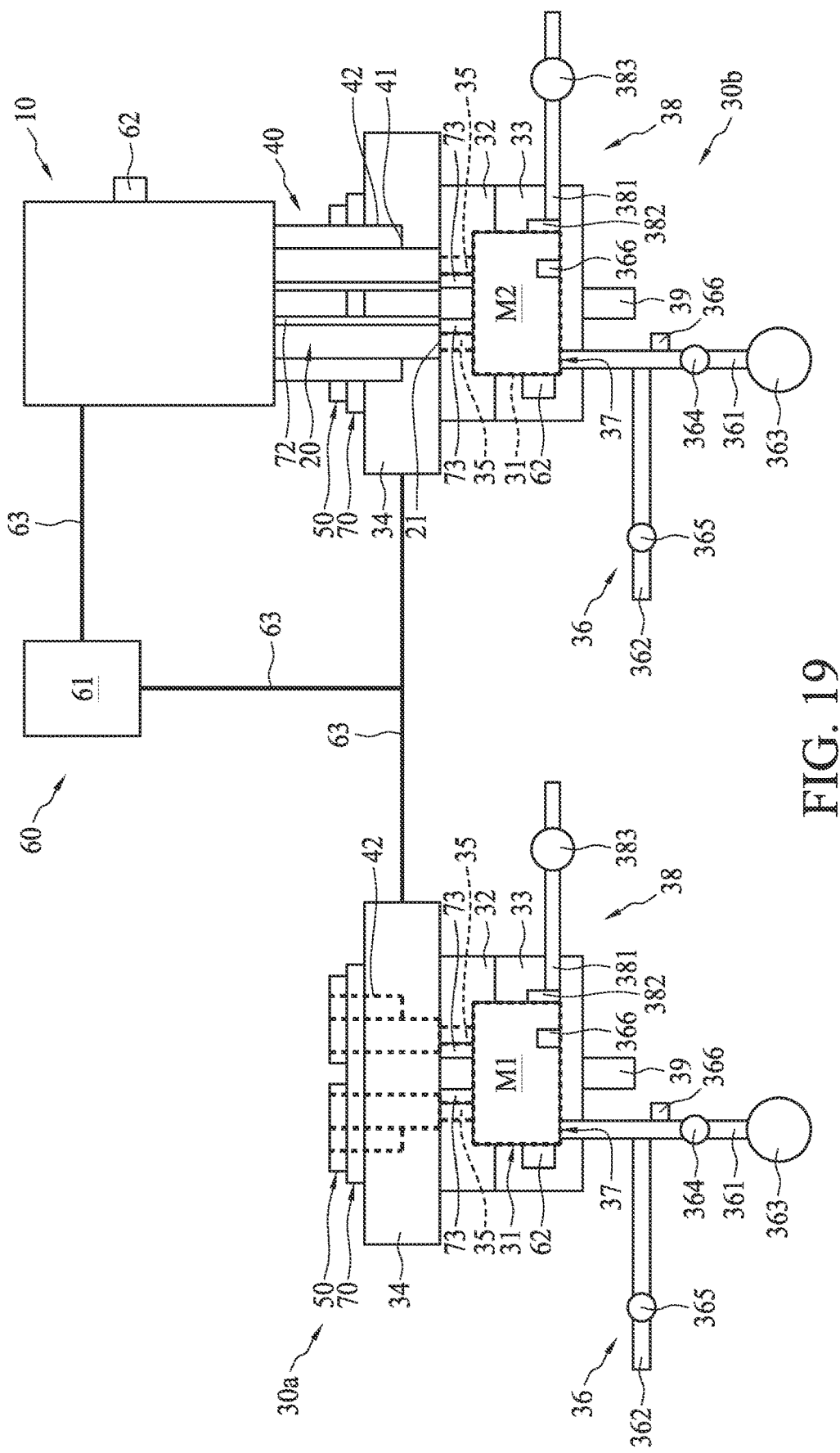

In some embodiments, the method 300 further includes discharging a second amount of the mixture M2 from the discharging channel 20 and injecting the second amount of the mixture M2 into the second mold cavity 31 through the outlet 21 and the second feeding port 35. In some embodiments, each of the first amount of the mixture and the second amount of the mixture has a predetermined ratio of the polymeric material to the blowing agent. In some embodiments, referring to FIG. 19, the discharging channel 20 is at least partially surrounded by the second molding device 30b upon the injection of the second amount of the mixture M2. Discharging and Injection of the second amount of the mixture M2 are respectively similar to step 308 and step 309, and similar details are not repeated herein.

In some embodiments, the method 300 further includes disengaging the outlet 21 from the second feeding port 35.

Figure 20:
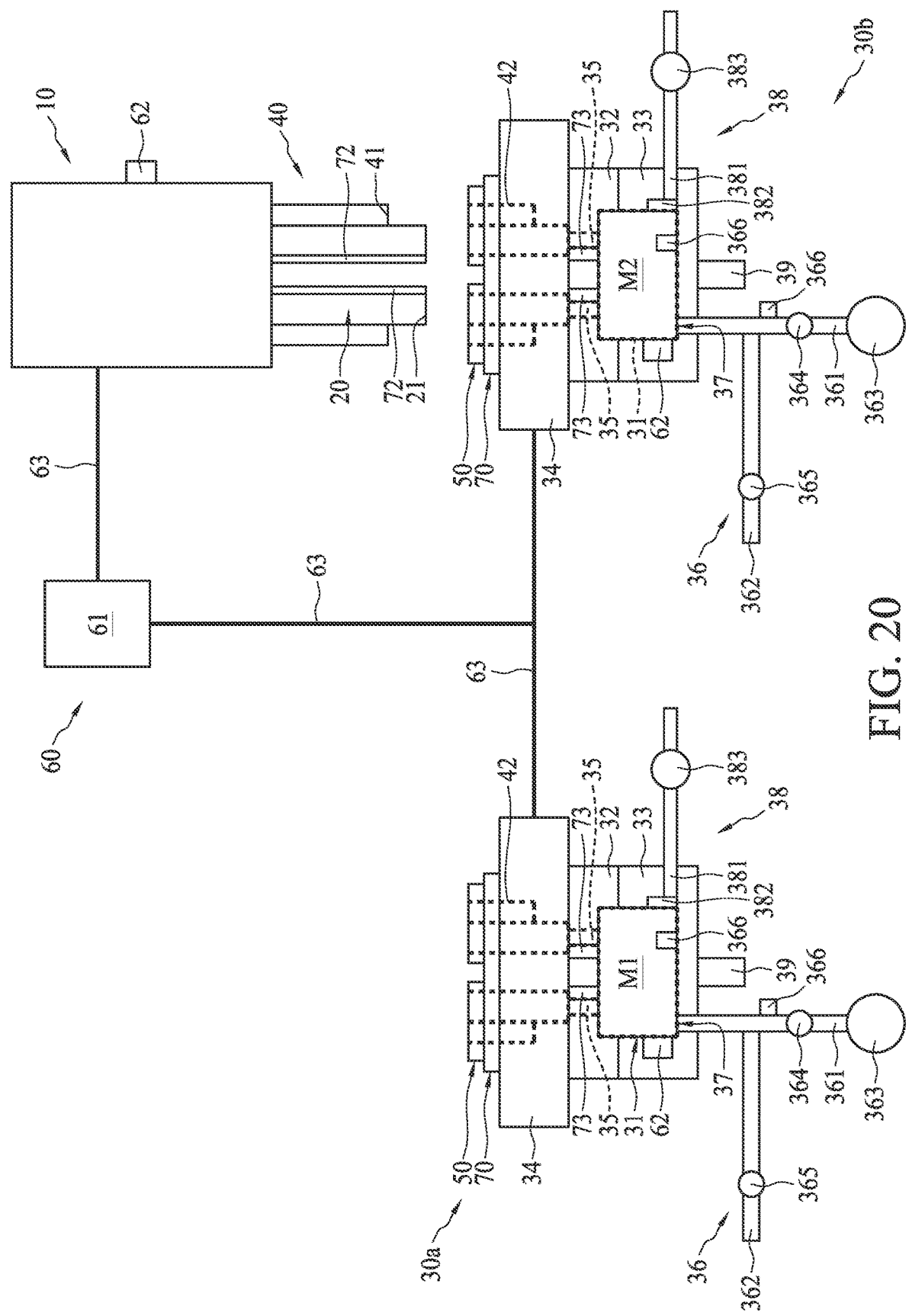

In some embodiments, referring to FIG. 20, after the injection of the second amount of the mixture M2 into the second mold cavity 31, the discharging channels 20 are disengaged from and moved away from the second molding device 30b. In some embodiments, the second feeding port 35 is covered upon or after the disengagement of the outlet 21 from the second feeding port 35.

In the above-mentioned Step 301 to Step 309 and the following process, the control system 60 automatically controls the extruding system 10, the discharging channels 20, the first and second molding devices 30a, 30b, the supporting device 40, the covers 50, and the insulator 70, the heaters 72, 73 in real time. In some embodiments, the control system 60 controls movement of the extruding system 10. In some embodiments, the control system 60 controls movement of the first and second molding devices 30a, 30b.

The method 300 is not limited to the above-mentioned embodiments. In some embodiments, the method of injection molding 300 uses any of the above-mentioned molding devices 100 and 200 as shown in FIG. 1 to FIG. 10.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. An injection molding system, comprising:
an extruding system configured to produce a mixture of a polymeric material and a blowing agent and including:
a melting unit configured to convey the polymeric material; and
a mixing unit configured to receive the polymeric material from the melting unit and configured to mix the polymeric material with the blowing agent and to form the mixture, wherein the mixing unit includes a hollow mixing cartridge and a mixing rotor disposed in the hollow mixing cartridge, a length of the mixing rotor extends along a length of the hollow mixing cartridge, and a ratio of a shortest distance between an inner sidewall of the hollow mixing cartridge and the mixing rotor to a diameter of the mixing rotor is in a range of about 1:1500 to about 1:4500;
a discharging channel communicable with the extruding system, wherein the discharging channel includes an outlet disposed distal to the extruding system and configured to discharge the mixture;
a molding device configured to receive the mixture from the outlet and including:
a mold cavity; and
a feeding port communicable with the mold cavity and correspondingly engageable with the outlet; and
a supporting device configured to facilitate an engagement of the discharging channel and the molding device, the supporting device includes a first element and a second element configured to engage with each other, wherein the first element of the supporting device protrudes from the extruding system to the second element disposed on the molding device.

2. The injection molding system of claim 1, wherein the mixture has a predetermined ratio of the polymeric material and the blowing agent.

3. The injection molding system of claim 1, wherein the extruding system further includes a flow control element disposed between the melting unit and the mixing unit and configured to control flow of the polymeric material from the melting unit to the mixing unit.

4. The injection molding system of claim 3, wherein the melting unit includes a pressing cartridge having a first pressure, and the hollow mixing cartridge has a second pressure less than the first pressure.

5. The injection molding system of claim 1, wherein the molding device further includes an inner top wall, an inner sidewall and an inner bottom wall opposite to the inner top wall, wherein the inner top wall, the inner sidewall and the inner bottom wall defines the mold cavity, and the feeding port is in communication with the mold cavity and disposed at the inner top wall.

6. The injection molding system of claim 5, wherein an area of the inner top wall is greater than an area of the inner sidewall.

7. The injection molding system of claim 5, wherein the molding device further includes a first gas conduit coupled to the inner bottom wall or the inner sidewall of the molding device and in communication with the mold cavity, and a second gas conduit coupled to the mold and in communication with the mold cavity.

8. The injection molding system of claim 1, wherein the first element includes an elongated portion fixed to the extruding system and an arm portion coupled to the elongated portion and received by the second element.

9. The injection molding system of claim 1, wherein the supporting device is disposed above the mold cavity of the molding device.

10. An injection molding method, comprising:
providing an extruding system configured to produce a mixture of a polymeric material and a blowing agent and having a melting unit and a mixing unit, a discharging channel communicable with the extruding system and including an outlet disposed distal to the extruding system and configured to discharge the mixture, and a first molding device including a first mold cavity and a first feeding port communicable with the first mold cavity and correspondingly engageable with the outlet, wherein the mixing unit includes a hollow mixing cartridge and a mixing rotor disposed in the hollow mixing cartridge, a length of the mixing rotor extends along a length of the hollow mixing cartridge, and a ratio of a shortest distance between an inner sidewall of the hollow mixing cartridge and the mixing rotor to a diameter of the mixing rotor is in a range of about 1:1500 to about 1:4500;
conveying the polymeric material from the melting unit to the mixing unit;
conveying the blowing agent into the mixing unit;
mixing the polymeric material with the blowing agent in the hollow mixing cartridge of the mixing unit to form the mixture;
conveying the mixture from the mixing unit to the discharging channel;
engaging the outlet with the first feeding port;
engaging a first element of a supporting device relative to a second element of the supporting device to secure the discharging channel with the first molding device, wherein the first element protrudes from the extruding system, and the second element is disposed on the first molding device to secure the discharging channel to the first molding device;
discharging a first amount of the mixture from the discharging channel; and
injecting the first amount of the mixture into the first mold cavity through the outlet and the first feeding port.

11. The method of claim 10, further comprising:
providing a second molding device including a second mold cavity and a second feeding port communicable with the second mold cavity and correspondingly engageable with the outlet; and
injecting a second amount of the mixture into the second mold cavity through the outlet and the second feeding port,
wherein each of the first amount of the mixture and the second amount of the mixture has a predetermined ratio of the polymeric material and the blowing agent.

12. The method of claim 11, wherein a ratio of the polymeric material to the blowing agent in the first amount of the mixture is substantially equal to a ratio of the polymeric material to the blowing agent in the second amount of the mixture.

13. The method of claim 10, wherein the polymeric material conveys from the melting unit to the mixing unit at a first flow rate, the blowing agent conveys into the mixing unit at a second flow rate, and the ratio of the first flow rate to the second flow rate is fixed.

14. The method of claim 10, wherein a ratio of the blowing agent to the polymeric material is constant.

15. The method of claim 10,
wherein a ratio of the blowing agent to the polymeric material of the mixture ranges between 4:1 to 3:1.

16. The method of claim 10, wherein the discharging channel is secured to the first molding device by rotating an elongated portion and an arm portion of the first element of the supporting device, the elongated portion is fixed to the extruding system and extends in a first direction toward the first molding device, and the arm portion is coupled to the elongated portion and extends in a second direction different from the first direction.

17. The method of claim 10, further comprising injecting a gas into the first mold cavity through a gas conduit in connection with the first mold cavity until the first mold cavity is sensed to have a predetermined pressure before injecting the first amount of the mixture into the first mold cavity.

18. The method of claim 17, further comprising foaming the first amount of the mixture in the first mold cavity, and discharging the gas in less than 1 second from the first mold cavity through the gas conduit during the foaming of the first amount of the mixture in the first mold cavity.

19. The method of claim 10, further comprising opening a flow control element disposed between the melting unit and the mixing unit when the polymeric material is conveyed from the melting unit to the mixing unit, and closing the flow control element when a first pressure of a pressing cartridge of the melting unit is substantially equal to a second pressure of the hollow mixing cartridge.

20. The method of claim 10, wherein the injection of the first amount of the mixture into the first mold cavity lasts for less than 1 second.

* * * * *